(12) United States Patent
Suzuki

(10) Patent No.: US 8,300,134 B2
(45) Date of Patent: Oct. 30, 2012

(54) IMAGE-TAKING APPARATUS, IMAGE-TAKING REGION DISPLAYING METHOD, AND IMAGE-TAKING REGION DISPLAYING PROGRAM

(75) Inventor: Hiroyuki Suzuki, Tokyo (JP)

(73) Assignee: Sony Corporation (JP)

( * ) Notice: Subject to any disclaimer, the term of this patent is extended or adjusted under 35 U.S.C. 154(b) by 474 days.

(21) Appl. No.: 12/587,599

(22) Filed: Oct. 9, 2009

(65) Prior Publication Data

US 2010/0097488 A1    Apr. 22, 2010

(30) Foreign Application Priority Data

Oct. 22, 2008  (JP) ................................ P2008-271876

(51) Int. Cl.
*H04N 5/222*  (2006.01)
*H04N 5/225*  (2006.01)

(52) U.S. Cl. ............ 348/333.02; 348/333.12; 348/220.1

(58) Field of Classification Search ............ 348/333.01, 348/333.02, 333.04, 333.11, 333.12, 220.1, 348/207.1; 345/157, 204
See application file for complete search history.

(56) References Cited

U.S. PATENT DOCUMENTS

| | | | | |
|---|---|---|---|---|
| 7,126,642 | B2 * | 10/2006 | Takechi et al. | 348/445 |
| 7,286,160 | B2 * | 10/2007 | Ejima et al. | 348/207.2 |
| 2002/0118386 | A1 * | 8/2002 | Sakai | 358/1.15 |
| 2004/0257458 | A1 * | 12/2004 | Huang et al. | 348/333.01 |
| 2005/0146631 | A1 * | 7/2005 | Shelton et al. | 348/333.12 |
| 2006/0132638 | A1 * | 6/2006 | Saitou | 348/333.01 |
| 2010/0110210 | A1 * | 5/2010 | Prentice | 348/222.1 |

FOREIGN PATENT DOCUMENTS

JP    2006-180152 A    7/2006

* cited by examiner

*Primary Examiner* — Nhan T Tran
(74) *Attorney, Agent, or Firm* — Lerner, David, Littenberg, Krumholz & Mentlik, LLP

(57) ABSTRACT

An image-taking apparatus is provided which includes a first extracting unit that extracts an image corresponding to a first region having a first aspect ratio and an image corresponding to a second region having a second aspect ratio from a video image to record the images, a second extracting unit that extracts an image having an aspect ratio of a display region of a display device from the video image in a range where the first region is maximally displayed, a producing unit that produces a notification image indicating that the second region exists outside the display region when the second region exists outside the region of the image extracted by the second extracting unit, a combining unit that produces a display image by combining the notification image with the image extracted by the second extracting unit, and a control unit that displays the display image on the display device.

2 Claims, 17 Drawing Sheets

FIG.2
| No. | ASPECT RATIO OF DISPLAY UNIT 112 | ASPECT RATIO OF MAIN IMAGE | ASPECT RATIO OF SUB-IMAGE | FRAME MODE |
|---|---|---|---|---|
| 1 | 16:9 | 16:9 | 4:3 | |
| 2 | 16:9 | 16:9 | 4:3 | |
| 3 | 16:9 | 16:9 | 4:3 | |
| 4 | 4:3 | 4:3 | 16:9 | |
| 5 | 4:3 | 4:3 | 16:9 | |
| 6 | 4:3 | 16:9 | 4:3 | |
DISPLAY UNIT 112     SUB-IMAGE PHOTOGRAPHING REGION 

_US 8,300,134 B2_

IMAGE-TAKING APPARATUS, IMAGE-TAKING REGION DISPLAYING METHOD, AND IMAGE-TAKING REGION DISPLAYING PROGRAM

CROSS-REFERENCE TO RELATED APPLICATION

The present application claims priority from Japanese Patent Application No. JP 2008-271876 filed in the Japanese Patent Office on Oct. 22, 2008, the entire content of which is incorporated herein by reference.

BACKGROUND OF THE INVENTION

1. Field of the Invention

The present invention relates to an image-taking apparatus, an image-taking region displaying method, and an image-taking region displaying program.

2. Description of the Related Art

Recently, an image-taking apparatus such as a digital video camera, the image can be taken while an aspect ratio of the image is switched to a plurality of aspect ratios such as 4:3 and 16:9. Sometimes the image-taking apparatus has a function of simultaneously taking a still image having the aspect ratio of 4:3 and a moving image having the aspect ratio of 16:9. In cases where the image-taking apparatus has the function of simultaneously taking the images having the plurality of aspect ratios, it is necessary that proper photographing regions corresponding to the plurality of aspect ratios be indicated to a user through a display.

For example, Japanese Patent Application Laid-Open No. 2006-180152 discloses a technique in which guide frames corresponding to aspect ratios are dynamically switched according to the aspect ratios of the simultaneously taken images to display the guide frames on a display device such as a liquid crystal display. When utilizing the technique disclosed in Japanese Patent Application Laid-Open No. 2006-180152, the user can visually recognize which range the image corresponding to each aspect ratio is recorded in by referring to the guide frame displayed on the display device.

SUMMARY OF THE INVENTION

However, in the technique disclosed in Japanese Patent Application Laid-Open No. 2006-180152, in order to indicate the photographing regions of the plurality of aspect ratios on the display device by the guide frame, it is necessary to indicate the guide frame every display region on the display device. Thus, it is necessary that the guide frames corresponding to the aspect ratios be indicated in ranges smaller than the display region of the display device. As a result, disadvantageously usability is deteriorated because the actually recorded photographing region is smaller than the image in the display region of the display device.

For example, in taking images having the plurality of aspect ratios, this remarkably becomes troublesome when an image having one aspect ratio is mainly taken while an image having another aspect ratio is taken as reference. That is, a guide frame corresponding to the image having one aspect ratio mainly taken and a guide frame corresponding to the image having another aspect ratio taken as reference are simultaneously indicated on the display device. Thus, for example, when the image having another aspect ratio taken as reference is larger than the image having one aspect ratio mainly taken, the guide frame corresponding to the image having one aspect ratio mainly taken is displayed smaller in the display region of the display device. As a result, it is necessary that the user adjust and operate flaming and focusing to take the image having the main aspect ratio while seeing the image in the guide frame indicated small, which causes an issue in that the usability becomes deteriorated.

The present invention has been made in views of the above issues, and it is desirable to provide a novel, improved image-taking apparatus, image-taking region displaying method, image-taking region displaying program, which can enhance the usability when the images having the plurality of aspect ratios are simultaneously taken.

According to an embodiment of the present invention, there is provided an image-taking apparatus including an image recording range extracting unit that extracts an image corresponding to a first image-taking region having a predetermined first aspect ratio and an image corresponding to a second image-taking region having a predetermined second aspect ratio from a video image of a subject of an image-taking target to record the image corresponding to the first image-taking region and the image corresponding to the second image-taking region, the second aspect ratio being different from the first aspect ratio, an image display range extracting unit that extracts an image having an aspect ratio of a display region of a display device from the video image of the subject of the image-taking target in a range where the first image-taking region is maximally displayed, the display device displaying the images corresponding to the first image-taking region and the second image-taking region, a region notification image producing unit that produces a region notification image indicating that the second image-taking region exists outside the display region of the display device when the second image-taking region exists outside the region of the image extracted by the image display range extracting unit, an image combining unit that produces a display image by combining the region notification image produced by the region notification image producing unit with the image extracted by the image display range extracting unit, and a display control unit that displays the display image produced by the image combining unit on the display device.

In the configuration of the image-taking apparatus according to the embodiment of the invention, the image recording range extracting unit can extract the image corresponding to the first image-taking region having the predetermined first aspect ratio and the image corresponding to the second image-taking region having the predetermined second aspect ratio that is different from the first aspect ratio from the video image of the subject that becomes photographing target, and the image recording range extracting unit can record the image corresponding to the first image-taking region and the image corresponding to the second image-taking region. The image display range extracting unit can extract the image having the aspect ratio of the display region of the display that displays the images corresponding to the first image-taking region and second image-taking region from the video image of the subject that becomes photographing target within the range where the first image-taking region is maximally displayed. The region notification image producing unit can produce the region notification image showing that the second image-taking region exists outside the display region of the display, when the second image-taking region exists outside the region of the image extracted by the image display range extracting unit. The image combining unit can produce the display image by combining the image extracted by the image display range extracting unit and the region notification image produced by the region notification image producing unit. The display control unit can display the display image produced by the image combining unit on the display.

The region notification image producing unit may produce the region notification image including a region notification icon, indicating a direction of the second image-taking region existing outside the display region of the display device.

The region notification image producing unit may produce the region notification image including a guide frame indicating a boundary of the second image-taking region when part of the boundary of the second image-taking region exists in the display region of the display device, the guide frame.

A combination of the first aspect ratio and the second aspect ratio may be an aspect ratio that is arbitrarily selected by a user.

A combination of the first aspect ratio and the second aspect ratio may be automatically switched according to an image-taking mode selected by the user.

The region notification image producing unit may produce a region notification image that is different from a region notification image in a state in which the image recording range extracting unit does not record the image corresponding to the second image-taking region, when the image recording range extracting unit is recording the image corresponding to the second image-taking region.

The image recording range extracting unit may record the image corresponding to the second image-taking region by combining predetermined memo information with the second image-taking region existing outside the display region of the display device.

The display device may be integrally provided, and the display control unit may display the display image produced by image combining unit on the display device.

The display control unit may display the display image produced by the image combining unit on a display device included in a predetermined external device externally connected.

According to another embodiment of the present invention, there is provided an image-taking region displaying method including the steps of extracting an image having an aspect ratio of a display region of a display device from a video image of a subject of an image-taking target in a range where a first image-taking region is maximally displayed, the display device displaying an image corresponding to the first image-taking region having a predetermined first aspect ratio and an image corresponding to a second image-taking region having a predetermined second aspect ratio, the second aspect ratio being different from the first aspect ratio, producing a region notification image indicating that the second image-taking region exists outside the display region of the display device when the second image-taking region exists outside the region of the image extracted in the image display range extracting step, producing a display image by combining the region notification image produced in the region notification image producing step with the image extracted in the image display range extracting step, and displaying the display image produced in the image combining step on the display device.

According to another embodiment of the present invention, there is provided an image-taking region displaying program that causes a computer to execute image display region extracting processing for extracting an image having an aspect ratio of a display region of a display device from a video image of a subject of an image-taking target in a range where a first image-taking region is maximally displayed, the display device displaying an image corresponding to the first image-taking region having a predetermined first aspect ratio and an image corresponding to a second image-taking region having a predetermined second aspect ratio, the second aspect ratio being different from the first aspect ratio, a region notification image producing processing for producing a region notification image indicating that the second image-taking region exists outside the display region of the display device when the second image-taking region exists outside the region of the image extracted by the image display range extracting unit, image combining processing for producing a display image by combining the region notification image produced by the region notification image producing processing with the image extracted by the image display range extracting processing, and display control processing for displaying the display image produced by the image combining processing on the display device.

As described above, according to the invention, the usability can be enhanced when the images having the plurality of aspect ratios are simultaneously taken.

BRIEF DESCRIPTION OF THE DRAWINGS

FIG. 2 illustrates an example of types of frame modes which can arbitrarily be selected by a user in the embodiment;

DETAILED DESCRIPTION OF THE EMBODIMENTS

Figure 1:
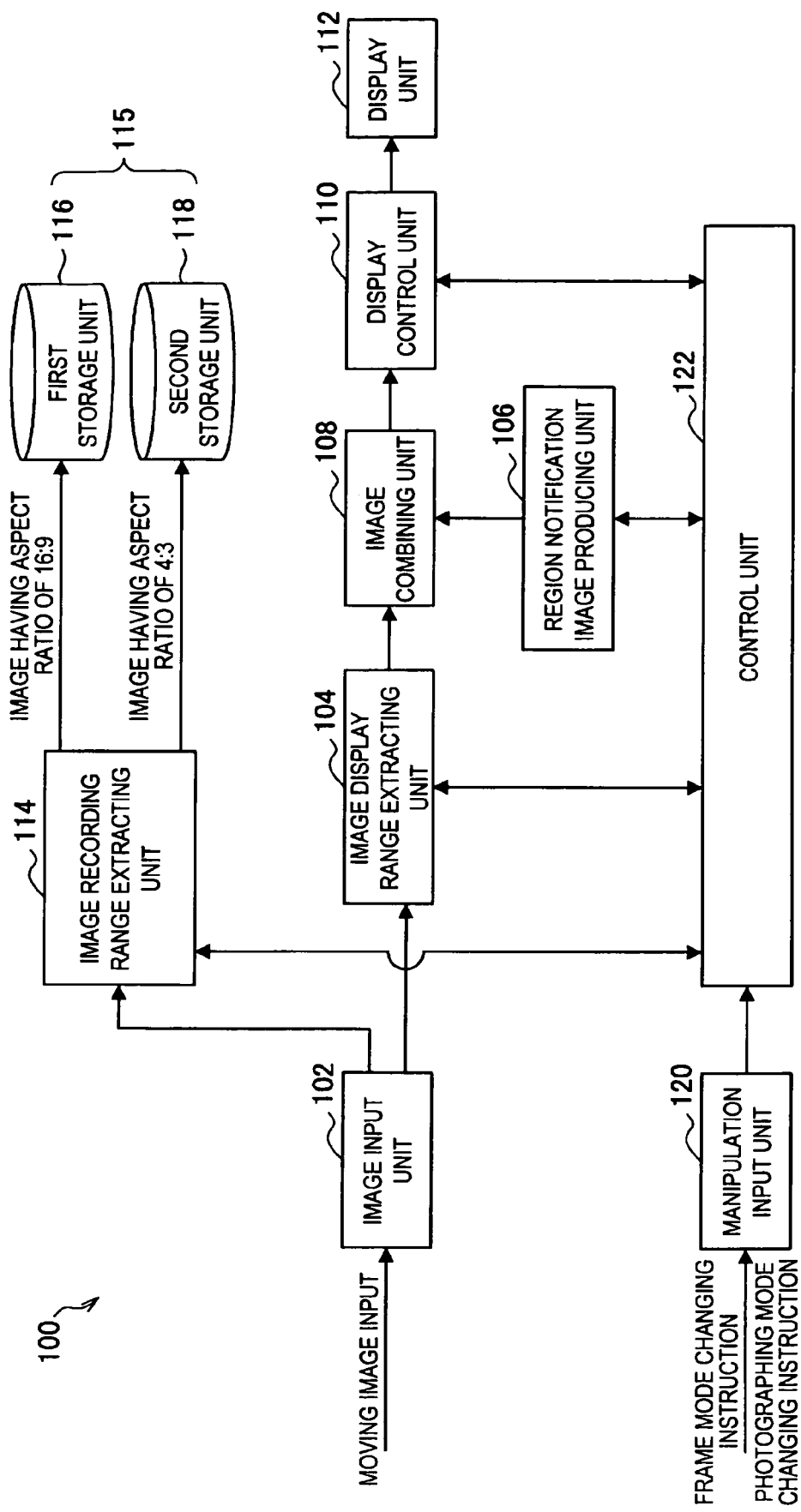
FIG. 1 is a block diagram illustrating an example of a functional configuration of an image-taking apparatus 100 according to an embodiment of the invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted. The description is made in the following order.

1. An outline of an embodiment of the invention
2. A functional configuration of an image-taking apparatus 100 of the embodiment
3. Types of frame modes
4. A display processing flow in a photographing region
5. A display processing flow in a photographing region in recording image data
6. An example of Utility in which photographs are simultaneously taken with the image-taking apparatus 100
7. A hardware configuration of the image-taking apparatus 100
8. Summary (1. OUTLINE OF EMBODIMENT OF THE INVENTION)

An image-taking apparatus 100 according to an embodiment of the invention will be described below in detail. First an outline of the embodiment will be described compared to the related art.

As described above, in the related art, sometimes the image-taking apparatus such as the digital still camera and the digital video camera has the function of simultaneously taking the images having the plurality of aspect ratios such as 4:3 and 16:9. In cases where the image-taking apparatus has the function of being able to simultaneously take the images having the plurality of aspect ratios, it is necessary that the proper photographing regions corresponding to the plurality of aspect ratios be indicated to the user through the display.

The technique disclosed in Japanese Patent Application Laid-Open No. 2006-180152 is well known as a method of simultaneously indicating the plurality of photographing regions to the user. In the technique disclosed in Japanese Patent Application Laid-Open No. 2006-180152, the guide frames corresponding to the aspect ratios are dynamically switched according to the aspect ratios of the simultaneously taken images to display the guide frames on the display device such as the liquid crystal display.

Figure 14:
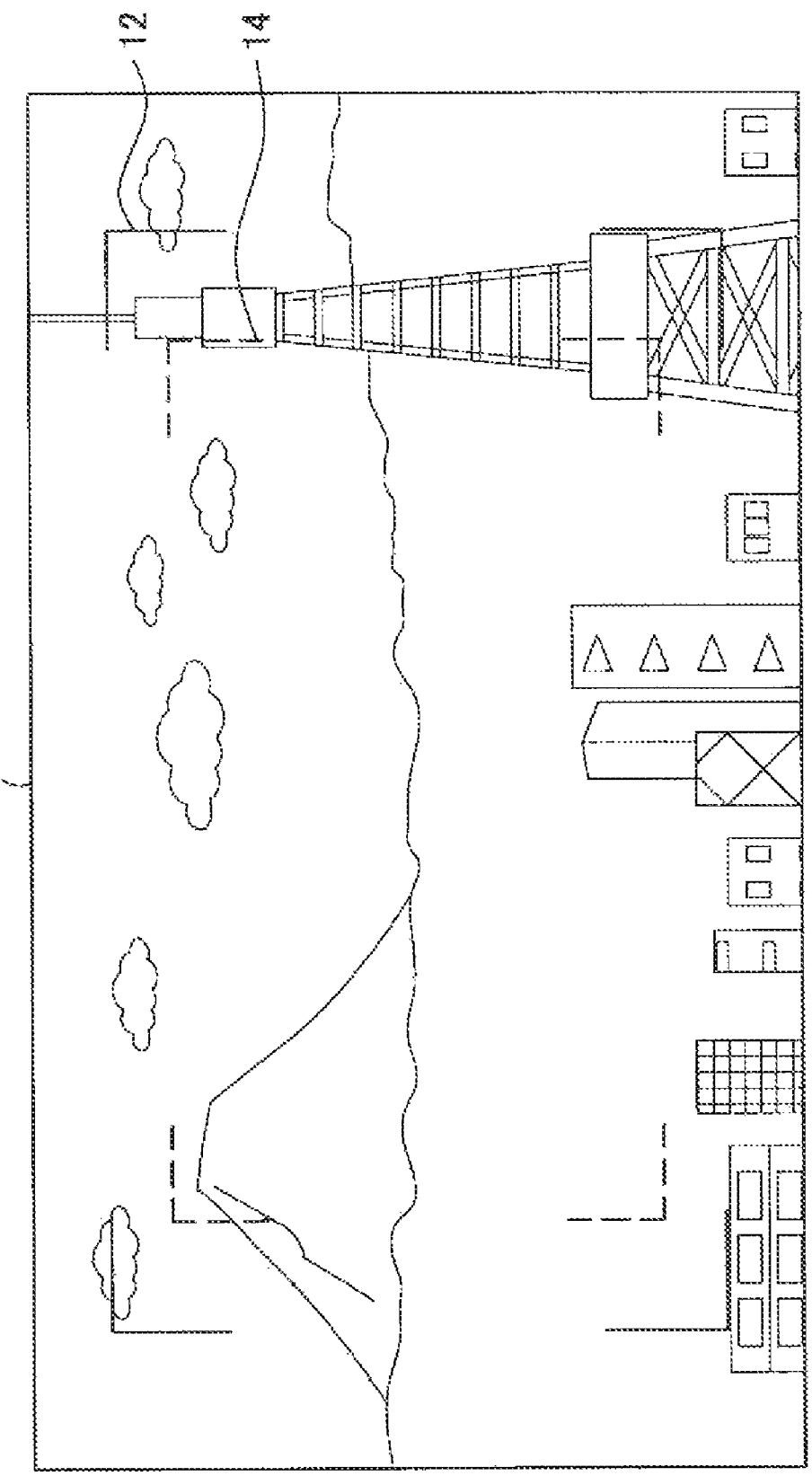
FIG. 14 illustrates a display example of a display device that displays photographing regions corresponding to the plurality of aspect ratios in an image-taking apparatus of the related art.

FIG. 14 illustrates a display example of a display device that displays photographing regions corresponding to the plurality of aspect ratios in an image-taking apparatus in which a technique disclosed in Japanese Patent Application Laid-Open No. 2006-180152 is used. FIG. 14 illustrates the display example when the user simultaneously takes the still image having the aspect ratio of 4:3, in which an image size of the still image is larger than that of the moving image, while taking the moving image having the aspect ratio of 16:9.

Referring to FIG. 14, the video image (hereinafter referred to as through image) of the subject caught by an image-taking element is displayed in a display region 10 of the display device. A moving image guide frame 14 expressing the photographing region of the moving image having the aspect ratio of 16:9 is indicated in the display region 10 of the display device by a broken line. A still image guide frame 12 expressing the photographing region of the still image having the aspect ratio of 4:3 is indicated in the display region 10 of the display device by a solid line. Therefore, the user can see the display device to recognize which range the moving image having the aspect ratio of 16:9 and the still image having the aspect ratio of 4:3 are recorded in.

Figure 15:
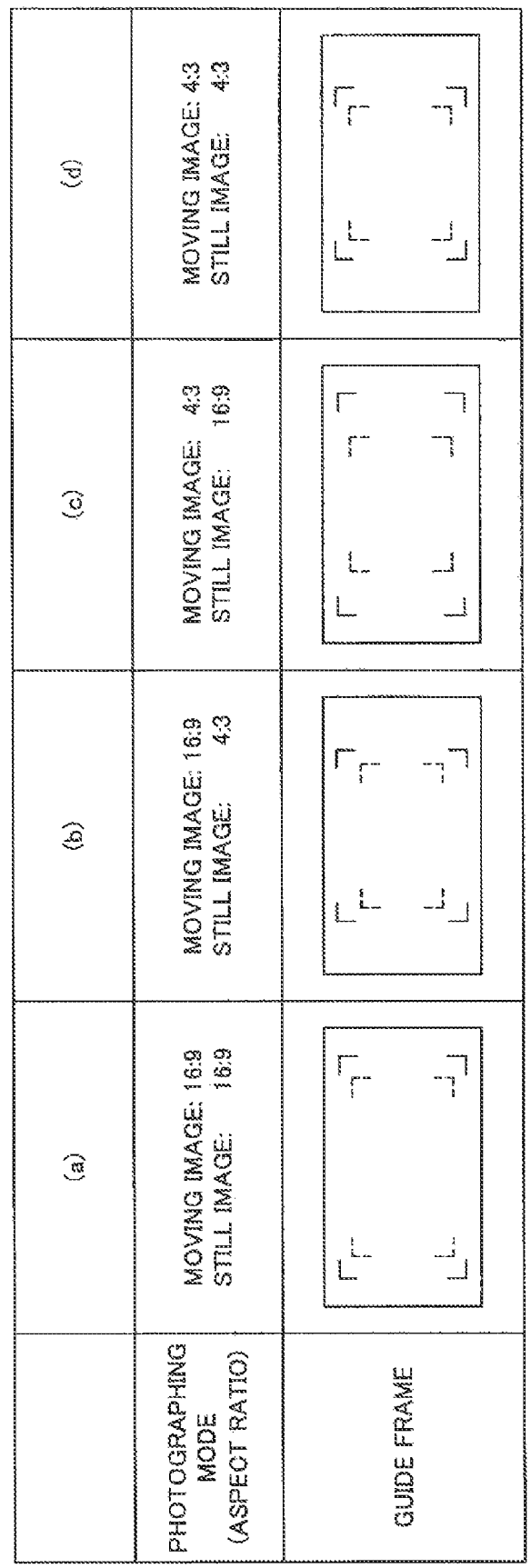
FIG. 15 illustrates combination examples of guide frames displayed on the display device that includes a display region 10 having the aspect ratio of 16:9 in the image-taking apparatus of the related art.

FIG. 15 illustrates combination examples of guide frames of photographing regions corresponding to the plurality of aspect ratios, displayed on the display device that includes a display region 10 having the aspect ratio of 16:9, in the image-taking apparatus in which the technique disclosed in Japanese Patent Application Laid-Open No. 2006-180152 is used. FIG. 15 illustrates display examples of the guide frames when the user simultaneously takes the still image having the aspect ratio of 4:3 or 16:9 while taking the moving image having the aspect ratio of 4:3 or 16:9.

FIG. 15A illustrates a display example of the guide frames when the user simultaneously takes the still image having the aspect ratio of 16:9, in which the image size of the still image is larger than that of the moving image, while taking the moving image having the aspect ratio of 16:9. FIG. 15B illustrates a display example of the display device when the user simultaneously takes the images having different aspect ratios like the moving image having the aspect ratio of 16:9 and the still image having the aspect ratio of 4:3. Similarly FIG. 15C illustrates a display example of the guide frame when the user simultaneously takes the moving image having the aspect ratio of 4:3 and the still image having the aspect ratio of 16:9, and FIG. 15D illustrates a display example of the guide frame when the user simultaneously takes the moving image having the aspect ratio of 4:3 and the still image having the aspect ratio of 4:3. Therefore, when seeing the guide frame displayed on the display device, the user can simultaneously take the moving image and the still image while recognizing which range the moving image and the still image are recorded in.

However, in the image-taking apparatus in which the technique disclosed in Japanese Patent Application Laid-Open No. 2006-180152 is utilized, because the guide frames corresponding to the plurality of photographing regions are displayed on the display device, it is necessary that at least one guide frame is displayed smaller than the display region of the display device. Therefore, disadvantageously the usability is deteriorated because the guide frame indicating the actually recorded photographing region is smaller than the display region 10 of the display device.

For example, in taking the images having the plurality of aspect ratios, this remarkably becomes troublesome when an image having one aspect ratio is mainly taken while an image having another aspect ratio is taken as reference. That is, the guide frame corresponding to the image having one aspect ratio mainly taken and the guide frame corresponding to the image having another aspect ratio taken as reference are simultaneously indicated on the display device. Thus, when the image having another aspect ratio taken as reference is larger than the image having one aspect ratio mainly taken, the guide frame corresponding to the image having one aspect ratio mainly taken is displayed smaller in the display region 10 of the display device. As a result, it is necessary that the user adjust and operate the flaming and focusing to take the image having the main aspect ratio while seeing the image in the guide frame indicated small, which causes the issue in that the usability becomes deteriorated.

Figure 16:
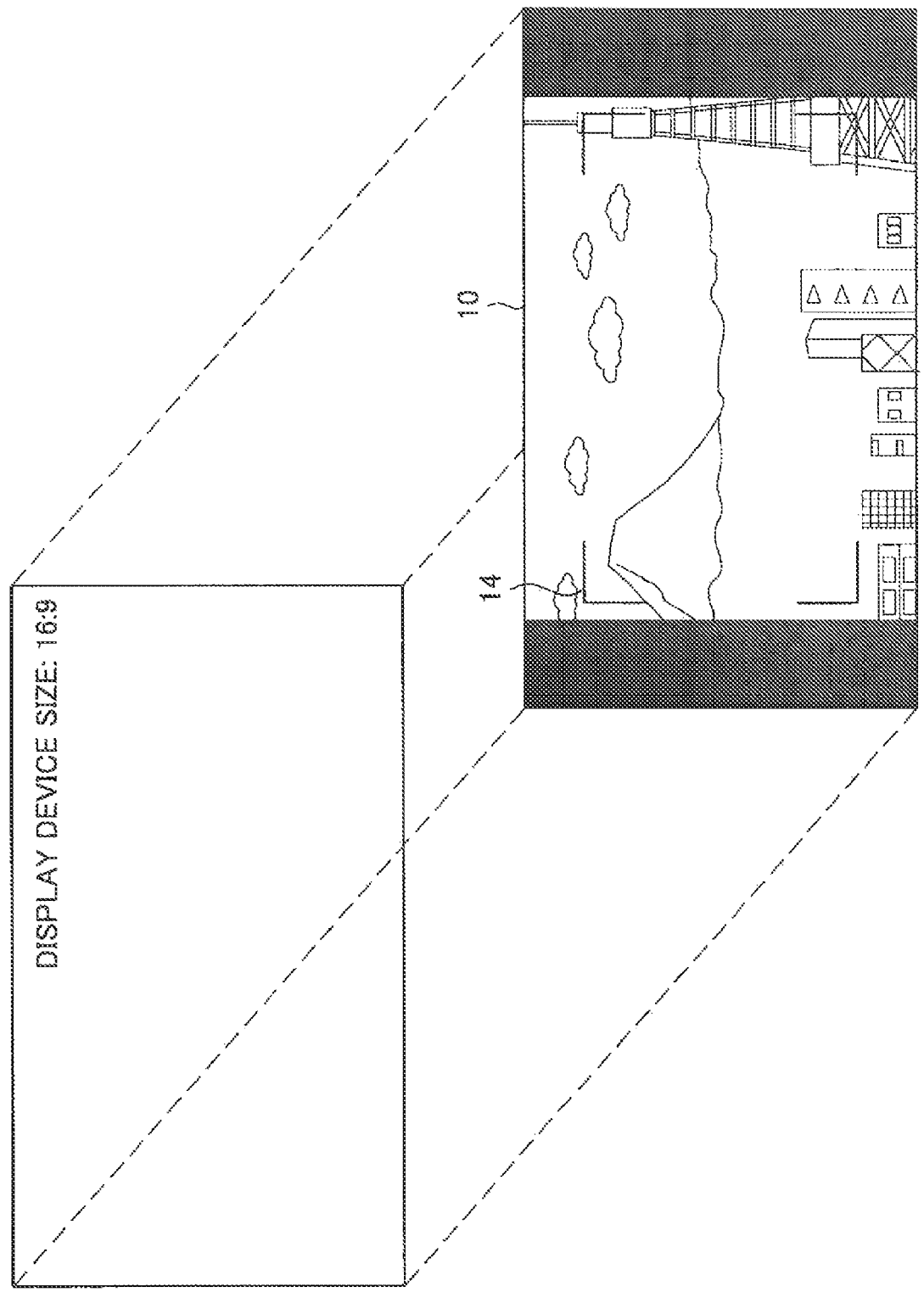
FIG. 16 illustrates a display example of the display device when a moving image having the aspect ratio of 16:9 and a still image having an aspect ratio of 4:3, in which an image size of the still image is larger than that of the moving image, are simultaneously taken with the image-taking apparatus of the related art.

The issue will be described below with reference to an example in which the user simultaneously takes the still image having the aspect ratio of 4:3 as a reference image, in which the image size of the still image is larger than that of the moving image, while taking the moving image having the aspect ratio of 16:9. FIG. 16 illustrates a display example of the display device when the moving image having the aspect ratio of 16:9 and the still image having the aspect ratio of 4:3, in which the image size of the still image is larger than that of the moving image, are simultaneously taken with the image-taking apparatus of the related art.

As illustrated in FIG. 16, the through image, in which the photographing region of the still image having the larger image size of 4:3 is maximally displayed, is indicated on the display device corresponding to the display size having the aspect ratio of 16:9. The moving image guide frame 14 corresponding to the moving image photographing region having the aspect ratio of 16:9 is also indicated in the through image. Therefore, in taking the reference image having the aspect ratio of 4:3, the user can take the image while seeing the image displayed on the display device. The user adjusts and operates the flaming and focusing while referring to the moving image guide frame 14 displayed on the display device, which allows the user to take the moving image having the mainly taken aspect ratio of 16:9. In the display example of FIG. 16, the through image is not displayed outside the photographing region having the aspect ratio of 4:3 for the sake of convenience. However, sometimes the through image is displayed in the whole of the display region 10 of the display device, and the still image guide frame 12 is indicated in the through image.

The moving image guide frame 14 corresponding to the moving image photographing region having the mainly taken aspect ratio of 16:9 is indicated smaller than the still image photographing region having the aspect ratio of 4:3 taken as reference on the display device. That is, although the user actually wants to confirm the detail photographing state of the moving image guide frame 14 corresponding to the moving image photographing region having the aspect ratio of 16:9, the moving image guide frame 14 is indicated small in the display region 10 of the display device. As a result, in taking the moving image having the aspect ratio of 16:9, although the user wants to finely adjust and operate the flaming and focusing, the moving image guide frame 14 is not indicated larger in the display region 10 of the display device, which causes the issue in that the usability is deteriorated.

Figure 17:
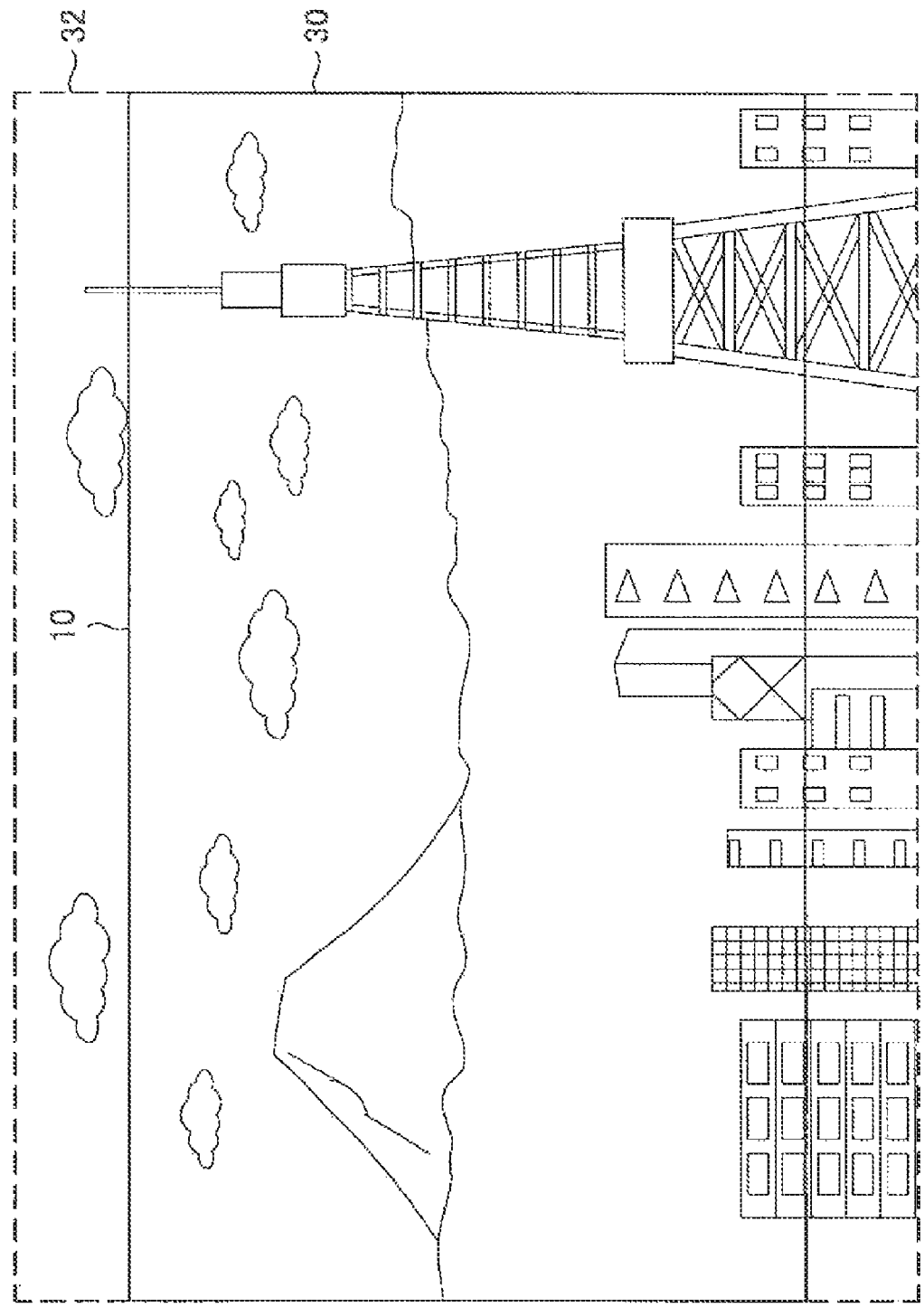
FIG. 17 illustrates another display example of the display device 10 when the moving image having the aspect ratio of 16:9 and the still image having the aspect ratio of 4:3, in which the image size of the still image is larger than that of the moving image, are simultaneously taken with the image-taking apparatus of the related art.

In order to solve the issue, for example, as illustrated in FIG. 17, it is considered that a moving image photographing region 30 of the mainly taken aspect ratio of 16:9 is maximally displayed in the display region 10 of the display device. However, at this point, a still image photographing region 32 having the aspect ratio of 4:3 taken as reference is not displayed in the display region 10 of the display device. As a result, even if the user sees the through image displayed on the display device, the user hardly recognizes how the still image having the aspect ratio of 4:3 is recorded, and the usability is not improved.

In the image-taking apparatus 100 of the embodiment of the invention, the issue of the image-taking apparatus in the related art can be solved.

Specifically, in the image-taking apparatus 100, the photographing region (hereinafter referred to as main image photographing region) of the image (hereinafter referred to as main image) having the mainly taken aspect ratio is maximally displayed in the display region of the display device. Further, in the image-taking apparatus 100, according to a size of the photographing region (hereinafter referred to as sub-image photographing region) of the image (hereinafter referred to as sub-image) having the aspect ratio that is different from the aspect ratio of the main image, switching of the display of the sub-image photographing region on the display device is controlled. Specifically, in the image-taking apparatus 100, a region notification image (such as an icon and a guide frame) that enables the user to recognize a boundary or a position of the sub-image photographing region is displayed on the display device according to the size of the sub-image photographing region. In the image-taking apparatus 100, the region notification image corresponding to the sub-image photographing region can appropriately be updated according to the size or aspect ratio of the sub-image.

Accordingly, the user can take the main image that the user mainly wants to take while referring to the main image photographing region maximally displayed in the display region of the display device to adjust and operate the flaming and focusing. For the sub-image taken as reference, the guide frame or icon are properly indicated according to the size of the sub-image photographing region, the user can take the image while appropriately confirming the sub-image photographing region.

Thus, in the image-taking apparatus 100 of the embodiment, when the images having the plurality of aspect ratios are simultaneously taken, the photographing regions of the images can be displayed on the display device by the high-usability displaying method.

The image-taking apparatus 100, which has such a feature, of the embodiment of the invention will be described in detail. In the following description, for the sake of convenience, that the user records a predetermined subject with the image-taking apparatus 100 is expressed by "photographing". However, the "photographing" also includes the meaning of "photographing" in which the video image of the subject is directly recorded.

(2. FUNCTIONAL CONFIGURATION OF IMAGE-TAKING APPARATUS 100 OF EMBODIMENT)

First a functional configuration of the image-taking apparatus 100 of the embodiment of the invention will be described. FIG. 1 is a block diagram illustrating an example of the functional configuration of the image-taking apparatus 100 of the embodiment.

Referring to FIG. 1, the image-taking apparatus 100 includes an image input unit 102, an image display range extracting unit 104, a region notification image producing unit 106, an image combining unit 108, a display control unit 110, a display unit 112, an image recording range extracting unit 114, a storage unit 115, and a manipulation input unit 120. A control unit 122 controls the functional units constituting the image-taking apparatus 100 to exert various functions. The functional units constituting the image-taking apparatus 100 of the embodiment will be described in detail.

(IMAGE INPUT UNIT 102)

Pieces of image data of the subject are continuously fed into the image input unit 102 through a lens and an image-taking element. The lens is used to form the image of the subject, and the lens includes a zoom lens that is used to realize a zoom function or a focus lens that brings the subject into focus. The image-taking element includes CCD (Charge Coupled Device) or CMOS (Complementary Metal Oxide Semiconductor). The image-taking element converts the subject image formed by the lens into an electric signal to produce analog image data. Then gain adjustment and A/D (Analogue/Digital) are performed to the image data supplied from the image-taking element, and the image data is fed into the image input unit 102.

The image data fed into the image input unit 102 is transferred to the later-mentioned image display range extracting unit 104, predetermined processing is performed to the image data, and the image data is displayed on the display unit 112. When the user provides an instruction to record the image data, after the image data fed into the image input unit 102 is transferred to the later-mentioned image recording range extracting unit 114, the image data is recorded in the storage unit 115 in a predetermined mode (such as image quality and aspect ratio).

(IMAGE DISPLAY RANGE EXTRACTING UNIT 104)

The image display range extracting unit 104 extracts only the image of the region displayed on the display unit 112 from the pieces of image data transferred from the image input unit 102. In response to the instruction supplied from the control unit 122, the image display range extracting unit 104 can extract the image region based on display performance of the display unit 112 and the aspect ratio, image size, and photographing mode that are set by the user. The image extracted by the image display range extracting unit 104 is transferred to the later-mentioned image combining unit 108, and the image is displayed on the display unit 112 after combined with the region notification image including the guide frame or icon. An example of the image extracted by the image display range extracting unit 104 is described in later-mentioned processing flow and display example.

(REGION NOTIFICATION IMAGE PRODUCING UNIT 106)

The region notification image producing unit 106 produces the region notification image in the image displayed on the display unit 112. The region notification image includes a guide frame 132 indicating the region where the photographing can be performed and a region notification icon 130 indicating the photographing region existing outside the display region of the display unit 112. Depending on the image size or aspect ratio of the image that the user wants to take, the image displayed on the display unit 112 is not always matched with the region where the photographing can be performed. Accordingly, in the image-taking apparatus 100, it is necessary to display the region where the photographing can be performed in the image of the display unit 112 that seen by the user in order to confirm the photographing region. In the image displayed on the display unit 112, the region notification image producing unit 106 produces the guide frame 132 indicating the photographing region in order to display the region where the photographing can be performed to the user. For example, in response to the instruction supplied from the control unit 122, the region notification image producing unit 106 can produce the guide frame 132 based on the aspect ratio, image size, and photographing mode that are set by the user.

As described above, the image-taking apparatus 100 can simultaneously take the images having the plurality of aspect ratios. At this point, when the region where the image having one of the aspect ratios can be taken is maximally displayed in the display region of the display unit 112, sometimes the region where the image having the other aspect ratio can be taken is larger than the image displayed on the display unit 112, and therefore the user hardly recognizes the photographing region of the image having the other aspect ratio even if the user sees the image displayed on the display unit 112. Accordingly, the region notification image producing unit 106 produces the region notification icon 130. The region notification icon 130 indicates that the region where the photographing can be performed exists outside the display region of the display unit 112 when the region where the photographing can be performed exists in the range wider than the image region (display region) displayed on the display unit 112. For example, in response to the instruction supplied from the control unit 122, the region notification image producing unit 106 can produce the region notification icon 130 based on the aspect ratio, image size, and photographing mode that are set by the user.

The guide frame 132 or the region notification image including the region notification icon, which is produced by the region notification image producing unit 106, is transferred to the later-mentioned image combining unit 108, and the guide frame 132 or the region notification image is displayed on the display unit 112 after combined with the image extracted by the image display range extracting unit 104. An example of the guide frame 132 or region notification icon 130, which is produced by the region notification image producing unit 106, is described in the later-mentioned processing flow and display example.

(IMAGE COMBINING UNIT 108)

The image combining unit 108 combines the region notification image produced by the region notification image producing unit 106 with the image data extracted by the image display range extracting unit 104, and the image combining unit 108 produces the image data displayed on the display unit 112. The image data produced by the image combining unit 108 is transferred to the later-mentioned display control unit 110, and the image data is displayed on the display unit 112.

(DISPLAY CONTROL UNIT 110)

The display control unit 110 controls the display of the display unit 112. The display control unit 110 controls various displays of the display unit 112. Examples of the various displays includes menu screen display, advanced setting screen display, image editing screen display, photographing screen display, and message display. When the user provides an instruction to display the menu screen through the manipulation input unit 120, the display control unit 110 displays the predetermined menu screen on the display unit 112. Therefore, the user can perform the manipulation regarding the various settings such as an initial setting, selection of a photographing mode, an image quality setting, an image size setting, an aspect ratio setting, a display setting, and image editing while seeing the menu screen displayed on the display unit 112. The display control unit 110 can appropriately change the menu screen displayed on the display unit 112 according to the manipulation of the user.

For example, when the user provides an instruction to make a transition to the image photographing mode through the manipulation input unit 120, the display control unit 110 displays the image data produced image combining unit 108 on the display unit 112. Therefore, the user can see the guide frame 132 or region notification icon 130, which is displayed on the display unit 112, to perform the photographing while confirming the region where the photographing can be performed.

The display control unit 110 can control the display of the display unit 112 in response to the instruction fed from the manipulation input unit 120 by the user, or in response to the instruction supplied from the control unit 122 based on the setting information stored in ROM (Read Only Memory). An example of the display control of the display unit 112, performed by the display control unit 110, in the image photographing mode is described in the later-mentioned processing flow and display example.

In addition to the above-described display control, the display control unit 110 additionally has various functions regarding the display control of the display unit 112. For example, the display control unit 110 compresses the image data produced by the image combining unit 108 in an image file suitable to display performance of the display unit 112, or the display control unit 110 converts the image data into the image file suitable to display performance of the display unit 112. Thus, the display control unit 110 controls various displays of the display unit 112. However, because the image-taking apparatus 100 of the embodiment has the feature of the method of performing the display on the display unit 112 in the image photographing mode, this point is mainly described below.

(DISPLAY UNIT 112)

For example, the display unit 112 includes LCD (Liquid Crystal Display) or an organic EL (Electro Luminescence display) display. The display unit 112 is mounted on the image-taking apparatus 100. The image in which the image is produced by the image combining unit 108, that is, the image extracted by the image display range extracting unit 104 is combined with the region notification image produced by the region notification image producing unit 106 is displayed on the display unit 112. The image data recorded in the storage unit 115, a notification message (such as photographing mode, empty capacity notification, and error notification) to the user, and the advanced setting screen can also be displayed on the display unit 112. The display device constituting the display unit 112 includes the display region having the aspect ratio of, for example, 16:9 or 4:3. However, there is no particular limitation to the aspect ratio.

It is not always necessary that the display unit 112 be included in the image-taking apparatus 100. For example, the display unit 112 may be included in an external device connected to the image-taking apparatus 100 (irrespective of wired and wireless). In such cases, the display control unit 110 transfers the image produced by the image combining unit 108 to the display unit 112 included in the external device. Therefore, the user can perform the image-taking function of the image-taking apparatus 100 while seeing the image displayed on the display unit 112 included in the external device.

(IMAGE RECORDING RANGE EXTRACTING UNIT 114)

The image recording range extracting unit 114 extracts only the image in the region where the photographing can be performed in the pieces of image data fed into the image input unit 102. For example, when the user provides an instruction to start the photographing of the moving image through the manipulation input unit 120, the image recording range extracting unit 114 continuously extracts only the pieces of image data in the photographing region from the image data fed from the image input unit 102, and the image recording range extracting unit 114 records the extracted pieces of image data in the storage unit 115 in a predetermined form of a moving image stream. At this point, the image recording range extracting unit 114 can extract the image data based on the image size or aspect ratio that is specified by the user or on the image size or aspect ratio that is automatically determined according to the photographing mode.

For example, when the user provides an instruction to take the still image through the manipulation input unit 120, the image recording range extracting unit 114 extracts only the image data in the photographing region from the image data of one frame fed into the image input unit 102, and the image recording range extracting unit 114 records the extracted image data in the storage unit 115 in a form of a still image file. At this point, the image recording range extracting unit 114 can extract the image data based on the image size or aspect ratio that is specified by the user or on the image size or aspect ratio that is automatically determined according to the photographing mode.

As described above, the image-taking apparatus 100 can simultaneously record the images having the plurality of aspect ratios. Accordingly, when the user provides the instruction to start the photographing of the images having the plurality of aspect ratios, the image recording range extracting unit 114 can also extract the pieces of image data in the photographing regions corresponding to the aspect ratios from the image data fed into the image input unit 102. For example, it is assumed that the user provides the instruction to take the still image corresponding to the aspect ratio of 4:3 while taking the moving image corresponding to the aspect ratio of 16:9. In such cases, the image recording range extracting unit 114 continuously extracts the pieces of image data in the photographing region having the aspect ratio of 16:9 from the image data fed into the image input unit 102, and the image recording range extracting unit 114 continuously records the extracted image data in the storage unit 115 in the predetermined form of the moving image stream. The image recording range extracting unit 114 extracts the image data in the photographing region having the aspect ratio of 4:3 from the image data of one frame fed into the image input unit 102 in parallel with the recording of the moving image stream, and the image recording range extracting unit 114 records the image data in the storage unit 115 in the predetermined form of the still image file. Therefore, the image-taking apparatus 100 can record the still image corresponding to the aspect ratio of 4:3 while recording the moving image data corresponding to the aspect ratio of 16:9 with respect to the image data fed into the image input unit 102.

Thus, when the user provides the instruction to start the photographing, the image recording range extracting unit 114 extracts only the image data in the photographing region from the image data fed from the image input unit 102, and the image recording range extracting unit 114 records the extracted image data in the storage unit 115. For example, in response to the instruction supplied from the control unit 122, the image recording range extracting unit 114 can extract the image data based on the aspect ratio, image size, and photographing mode that are set by the user. The image that can be extracted by the image recording range extracting unit 114 is not limited to the specific image size or aspect ratio. That is, the aspect ratio in the embodiment is described only by way of example, and the image recording range extracting unit 114 can extract the images having various aspect ratios that are set by the user or the photographing mode. In the embodiment, the still image is simultaneously taken while taking the moving image, however, the invention is not limited to this. Alternatively, the image-taking apparatus 100 may simultaneously record the moving image having a certain aspect ratio while recording the moving image having another aspect ratio, or the still images having the different aspect ratios may simultaneously be recorded. A flow of image data extracting processing performed by the image recording range extracting unit 114 is described in the later-mentioned processing flow.

(STORAGE UNIT 115)

The storage unit 115 acts as a nonvolatile storage region in which the image data extracted by the image recording range extracting unit 114 is recorded. For example, the storage unit 115 includes a magnetic storage device such as HDD, a semiconductor storage device, an optical storage device, or a magneto-optical storage device. The storage unit 115 is not limited to the specific configuration when a nonvolatile storage device in which the plurality of pieces of image data can be stored is used as the storage unit. It is not always necessary that the storage unit 115 be incorporated in the image-taking apparatus 100. For example, the storage unit 115 may be included in a recording medium, such as a memory stick (registered trademark) and an SD memory card, which is inserted in a recording medium insertion unit (not illustrated) included in the image-taking apparatus 100.

As illustrated in FIG. 1, the storage unit 115 may include the plurality of storage regions where the image data is stored in the predetermined recording form. In the embodiment of FIG. 1, the storage unit 115 includes a first storage unit 116 in which the image data having the aspect ratio of 16:9 is stored and a second storage unit 118 in which the image data having the aspect ratio of 4:3 is stored. Thus, for example, when the user provides the instruction to take the image data having the aspect ratio of 16:9 through the manipulation input unit 120, the taken image data having the aspect ratio of 16:9 is recorded in the first storage unit 116. When the user provides the instruction to take the image data having the aspect ratio of 4:3 through the manipulation input unit 120, the taken image data having the aspect ratio of 4:3 is recorded in the second storage unit 118. The user can display the image data having the aspect ratio of 16:9 recorded in the first storage unit 116 or the image data having the aspect ratio of 4:3 recorded in the second storage unit 118 on the display unit 112, or the user can transfer the image data having the aspect ratio of 16:9 and the image data having the aspect ratio of 4:3 to the external device connected to the image-taking apparatus 100. The configuration of the storage unit 115 of FIG. 1 is described only by way of example, and the invention is not limited to the configuration of the storage unit 115 of FIG. 1. That is, the storage unit 115 may include one storage region or at least three storage regions.

(MANIPULATION INPUT UNIT 120)

The manipulation input unit 120 includes a manipulation unit such as a touch panel, a button, a switch, a lever, and a dial. The user can operate the manipulation unit to provide an instruction of a processing operation (such as a mode change, an aspect ratio setting, an image quality setting, a photographing operation, zooming, focusing, aperture, and shutter speed changes, and a reproducing operation) to the image-taking apparatus 100. The manipulation input unit 120 transmits instruction information received from the user through the manipulation unit to the control unit 122. The control unit 122 controls the functional units included in the image-taking apparatus 100 to perform various functions desired by the user based on the instruction information transmitted from the manipulation input unit 120.

(CONTROL UNIT 122)

The control unit 122 is an operation processing device and a control device, which control the whole of the image-taking apparatus 100. For example, the control unit 122 includes CPU (Central Processing Unit). In response to the instruction supplied from the manipulation input unit 120, the control unit 122 provides the instruction to perform predetermined processing to each functional unit of the image-taking apparatus 100. A flow of processing performed by each functional unit in response to the instruction of the control unit 122 is described later.

An example of the functional configuration of the image-taking apparatus 100 of the embodiment is described above. The function of realizing the photographing region display that is of the feature of the embodiment is mainly described in the functional configuration of FIG. 1, and the invention is not limited to the functional configuration of FIG. 1. For example, in addition to the functional units of FIG. 1, the image-taking apparatus 100 may have various functions, such as a sound input and output function, a communication function, an image editing function, and an image reproducing function, which are possessed by a usual image-taking apparatus.

(3. TYPES OF FRAME MODES)

As described above, the image-taking apparatus 100 of the embodiment can simultaneously record the pieces of image data having the plurality of aspect ratios. In simultaneously recording the pieces of image data of the plurality of aspect ratios, the guide frame 132 or region notification icon 130 that indicates the region where the photographing can be performed in each aspect ratio is displayed on the display unit 112. Accordingly, the guide frame 132 or region notification icon 130 that is displayed on the display unit 112 depends on the aspect ratio and size of the simultaneously recorded image. In the image-taking apparatus 100 of the embodiment, a display mode (hereinafter referred to as frame mode) of the display unit 112 can previously registered in a nonvolatile storage region such as ROM according to the aspect ratio and size of the simultaneously recorded image. The can refer to the menu screen displayed on the display unit 112 to select any frame mode through the manipulation input unit 120.

FIG. 2 illustrates an example of types of the frame modes which can arbitrarily be selected by a user. The six frame modes of FIG. 2 are described only by way of example, and the invention is not limited to the six frame modes of FIG. 2. That is, the aspect ratio, the type of the display unit 112, and the number of frame modes may be different from those of FIG. 2. The examples of the frame modes of FIG. 2 will be described.

Referring to FIG. 2, frame mode Nos. 1 to 3 are frame modes corresponding to the display unit 112 including the display region having the aspect ratio of 16:9. Frame mode Nos. 4 to 6 are frame modes corresponding to the display unit 112 including the display region having the aspect ratio of 4:3. Thus, the image-taking apparatus 100 has frame modes corresponding to the display unit 112 including the display regions having the plurality of aspect ratios. Therefore, even if the display device acting as the display unit 112 is included in the external device connected to the image-taking apparatus 100, the user can select the proper frame mode according to the aspect ratio of the display region of the display unit 112.

The frame mode Nos. 1 to 3 are frame modes in which the image having the aspect ratio of 16:9 is recorded as the main image while the image having the aspect ratio of 4:3 is recorded as the sub-image. As illustrated in FIG. 2, in the frame mode Nos. 1 to 3, because the main image having the aspect ratio of 16:9 is displayed on the display unit 112 having the aspect ratio of 16:9, the main image photographing region is maximally displayed in the display region of the display unit 112.

On the other hand, the sub-image photographing region depends on the image size having the aspect ratio of 4:3. For example, the frame mode No. 1 corresponds to the case in which the sub-image and the main image are recorded while crosswise sizes of the sub-image and the main image are unified. That is, a crosswise boundary of the sub-image photographing region is maximally displayed in the display region of the display unit 112, and the longitudinal boundary of the sub-image photographing region exists outside the display region of the display unit 112. The frame mode No. 2 corresponds to the case in which the sizes of the sub-image and main image are different from each other in both the crosswise and longitudinal directions. That is, the longitudinal boundary of the sub-image photographing region exists outside the display region of the display unit 112, and the crosswise boundary of the sub-image photographing region exists in the display region of the display unit 112. The frame mode No. 3 corresponds to the case in which the sub-image and main image are recorded while the longitudinal sizes of the sub-image and main image are unified. That is, the longitudinal boundary of the sub-image photographing region is maximally displayed in the display region of the display unit 112, and the crosswise boundary of the sub-image photographing region exists in the display region of the display unit 112.

The frame mode Nos. 4 and 5 are frame modes in which the image having the aspect ratio of 4:3 is recorded as the main image while the image having the aspect ratio of 16:9 is recorded as the sub-image. As illustrated in FIG. 2, in the frame mode 4 and 5, because the main image having the aspect ratio of 4:3 is displayed on the display unit 112 having the aspect ratio of 4:3, the main image photographing region is maximally displayed in the display region of the display unit 112.

On the other hand, the sub-image photographing region depends on the image size having the aspect ratio of 16:9. For example, the frame mode No. 4 corresponds to the case in which the sub-image and the main image are recorded while longitudinal sizes of the sub-image and the main image are unified. That is, the longitudinal boundary of the sub-image photographing region is maximally displayed in the display region of the display unit 112, and the crosswise boundary of the sub-image photographing region exists outside the display region of the display unit 112. The frame mode No. 5 corresponds to the case in which the sizes of the sub-image and main image are different from each other in both the crosswise and longitudinal directions. That is, the crosswise boundary of the sub-image photographing region exists outside the display region of the display unit 112, and the longitudinal boundary of the sub-image photographing region exists in the display region of the display unit 112.

The frame mode No. 6 is a frame mode in which the image having the aspect ratio of 16:9 is recorded as the main image while the image having the aspect ratio of 4:3 is recorded as the sub-image. As illustrated in FIG. 2, in the frame mode No. 6, because the main image has the aspect ratio of 16:9, the main image photographing region having the aspect ratio of 16:9 is maximally displayed in the display region of the display unit 112 having the aspect ratio of 4:3.

On the other hand, the sub-image photographing region depends on the image size having the aspect ratio of 4:3. In the example of FIG. 2, the sub-image photographing region corresponds to the case in which the sub-image and the main image are recorded while the crosswise sizes of the sub-image and main image are unified. That is, because the sub-image photographing region is matched with the display region of the display unit 112, the sub-image photographing region is maximally displayed in the display region of the display unit 112.

When simultaneously taking the images having the plurality of aspect ratios, the user can select any frame mode from the previously set a plurality of frame modes through the manipulation input unit 120. The control unit 122 can provide the instruction to extract the image having the proper range to the image display range extracting unit 104 based on the frame mode selected by the user, and the control unit 122 can provide the instruction to properly produce the guide frame 132 or region notification icon 130 to the region notification image producing unit 106. A display example of the guide frame 132 or region notification icon 130 that indicates the sub-image photographing region is described later.

In the embodiment, the frame mode is not always selected by the manipulation of the user. For example, in the image-taking apparatus 100, the frame mode can automatically be switched while interlocked with the photographing mode or the zoom function. For example, in taking the moving image or still image, the user can select various photographing mode functions, such as an HD mode, an SD mode, a panoramic mode, and a cinema mode, which are possessed by the image-taking apparatus 100 and perform the photographing. When the digital zoom function is utilized during the photographing, the image size can arbitrarily be changed. Accordingly, in the image-taking apparatus 100, the frame modes corresponding to the photographing modes are previously registered, and the transition can be made to the frame mode corresponding to the selected photographing mode when the user selects the predetermined photographing mode. In cases where the user utilizes the zoom function during the photographing, the transition can appropriately be made to the frame mode according to the selected image size.

In the frame mode of FIG. 2, for example, it is assumed that the still image having the aspect ratio of 4:3 including a character string is recorded as reference data in the region straying from the photographing region having the aspect ratio of 16:9 while the HD moving image having the aspect ratio of 16:9 is taken. Thus, in cases where the photographing mode for simultaneously taking the still image having the aspect ratio of 4:3 is selected in taking the HD moving image having the aspect ratio of 16:9, the image-taking apparatus 100 may automatically change the frame mode to the frame mode No. 1. In cases where the size of the still image having the aspect ratio of 4:3 is changed by the zoom function in simultaneously taking the HD moving image having the aspect ratio of 16:9 and the still image having the aspect ratio of 4:3 in the frame mode No. 1, the image-taking apparatus 100 may automatically change the frame mode to the frame mode Nos. 2 and 3.

It is also assumed that the panoramic still image having the aspect ratio of 16:9 is simultaneously taken as the reference data while the SD moving image having the aspect ratio of 4:3 is taken. In cases where the photographing mode for simultaneously taking the panoramic still image having the aspect ratio of 16:9 is selected in taking the HD moving image having the aspect ratio of 4:3, the image-taking apparatus 100 may automatically change the frame mode to the frame mode No. 4. In cases where the size of the still image having the aspect ratio of 16:9 is changed by the zoom function in simultaneously taking the SD moving image having the aspect ratio of 4:3 and the still image having the aspect ratio of 16:9 in the frame mode No. 4, the image-taking apparatus 100 may automatically change the frame mode to the frame mode No. 5.

In cases where the display unit 112 having the aspect ratio of 4:3 is used, it is also assumed that the user selects the photographing mode for taking the panoramic image having the aspect ratio of 16:9 as the main image. When the user selects the photographing mode for taking the panoramic image having the aspect ratio of 16:9 as the main image, the image-taking apparatus 100 may automatically change the frame mode to the frame mode No. 6.

Thus, the image-taking apparatus 100 of the embodiment can automatically change the frame mode while the frame mode is interlocked with the photographing mode and the zoom function. The control unit 122 can provide the instruction to change the range of the image extracted by the image display range extracting unit 104 or the region notification image produced by the region notification image producing unit 106 based on the automatically changed frame mode. As a result, a troublesome manipulation such that the user specifies the frame mode every time after selecting the photographing mode can be eliminated because the proper frame mode is automatically selected when the user selects the desired photographing mode.

The photographing modes and the types of the frame modes corresponding to the photographing modes are described only by way of example, and the invention is not limited to the above-described photographing modes and types of the frame modes corresponding to the photographing modes. That is, in the image-taking apparatus 100, the predetermined frame modes can previously be registered according to the predetermined photographing modes, and the types of the photographing mode and the types and combinations of the corresponding frame modes can arbitrarily changed.

(4. FLOW OF PROCESSING FOR DISPLAYING PHOTOGRAPHING REGION)

Figure 3:
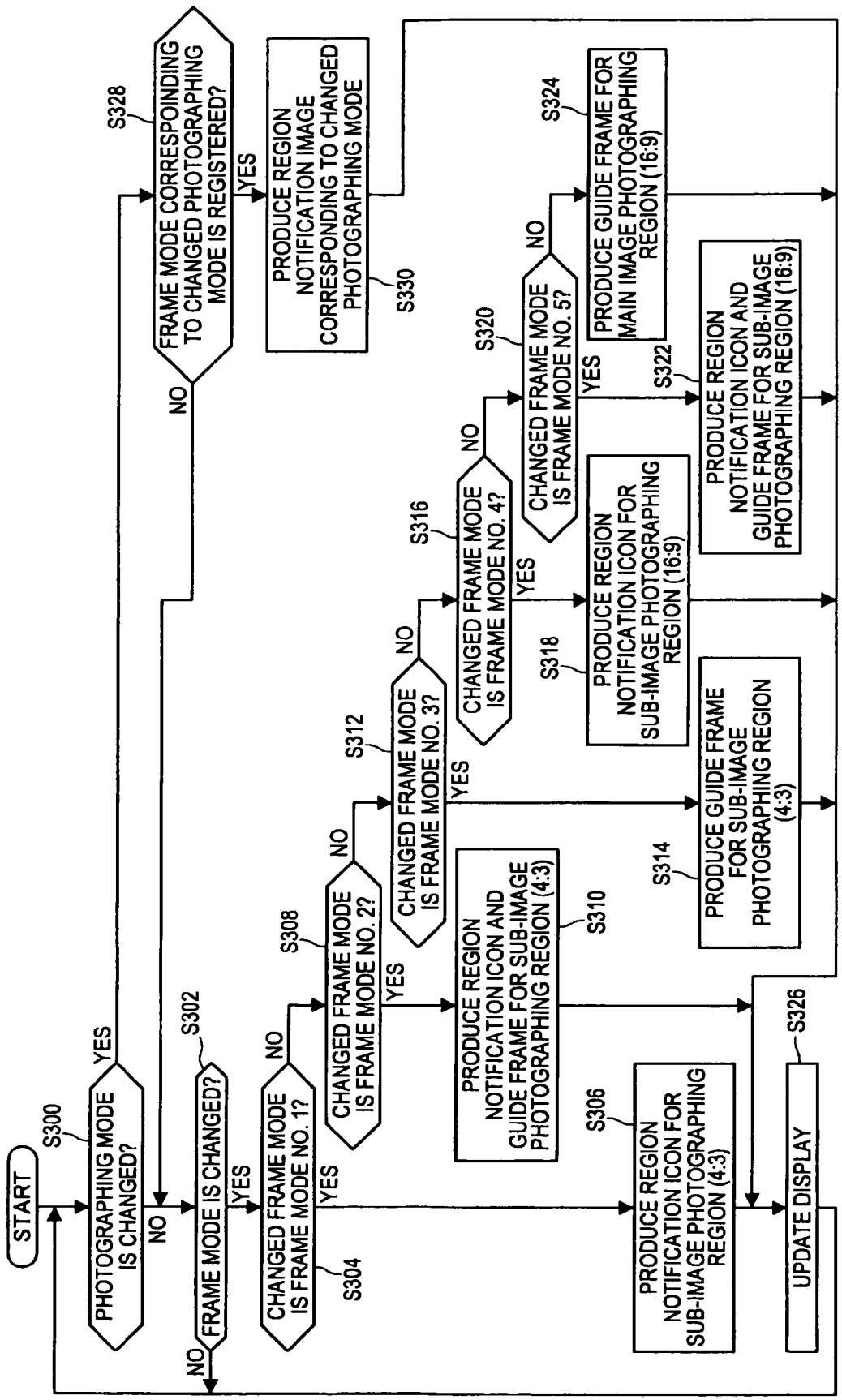
FIG. 3 illustrates an example of a flow of processing for displaying a photographing region of each image on a display unit 112 when the image-taking apparatus 100 of the embodiment simultaneously takes images having a plurality of aspect ratios.

An example of a flow of the processing for displaying the photographing region of each image on the display unit 112 based on each the frame mode when the image-taking apparatus 100 simultaneously records images having the plurality of aspect ratios. FIG. 3 illustrates an example of the flow of the processing for displaying the photographing region of each image on the display region of the display unit 112 when the image-taking apparatus 100 of the embodiment simultaneously records images having the plurality of aspect ratios.

Referring to FIG. 3, in Step 300, the control unit 122 of the image-taking apparatus 100 determines whether the user provides the instruction to change the photographing mode. As described above, in the image-taking apparatus 100 of the embodiment, the frame mode can automatically be changed while interlocked with the change of the photographing mode when the frame mode corresponding to the changed photographing mode is registered. Accordingly, the control unit 122 determines whether the instruction to change the photographing mode is provided. The control unit 122 can determine whether the user provides the instruction to change the photographing mode based on information on the user's manipulation transmitted from the manipulation input unit 120.

When determining that the user does not provide the instruction to change the photographing mode in Step 300, the control unit 122 determines whether the user provides the instruction to change the frame mode in Step 302. As described above, the user can select any frame mode from the plurality of frame modes previously registered in the image-taking apparatus 100. Accordingly, the control unit 122 determines whether the user provides the instruction to change the frame mode, and the control unit 122 provides the instruction to perform the display corresponding to the selected frame mode to the functional units when the user provides the instruction to change the frame mode. The control unit 122 can determine whether the user provides the instruction to change the frame mode based on information on the user's manipulation transmitted from the manipulation input unit 120.

When determining that the user provides the instruction to change the frame mode in Step 302, the control unit 122 determines whether the changed frame mode is the frame mode No. 1 in Step 304.

When determining that the frame mode is changed to the frame mode No. 1 in Step 304, the control unit 122 provides the instruction to perform the processing for displaying the photographing region corresponding to the frame mode No. 1 to the functional units in Step 306. Specifically, in response to the instruction provided from the control unit 122, the image display range extracting unit 104 extracts the image corresponding to the display unit 112 having the aspect ratio of 16:9 from the images fed into the image input unit 102 in the range where the main image image-taking region is maximally displayed. As illustrated in FIG. 2, the longitudinal boundary of the sub-image photographing region corresponding to the frame mode No. 1 exists outside the display region of the display unit 112. Accordingly, in response to the instruction provided from the control unit 122, the region notification image producing unit 106 produces the region notification image including the region notification icon 130. The region notification icon 130 is used to notify the user that the sub-image photographing region having the aspect ratio of 4:3 exists outside the display region of the display unit 112. The image combining unit 108 produces the image, in which the image extracted by the image display range extracting unit 104 and the region notification image including the region notification icon 130 produced by the region notification image producing unit 106 are combined.

Figure 4:
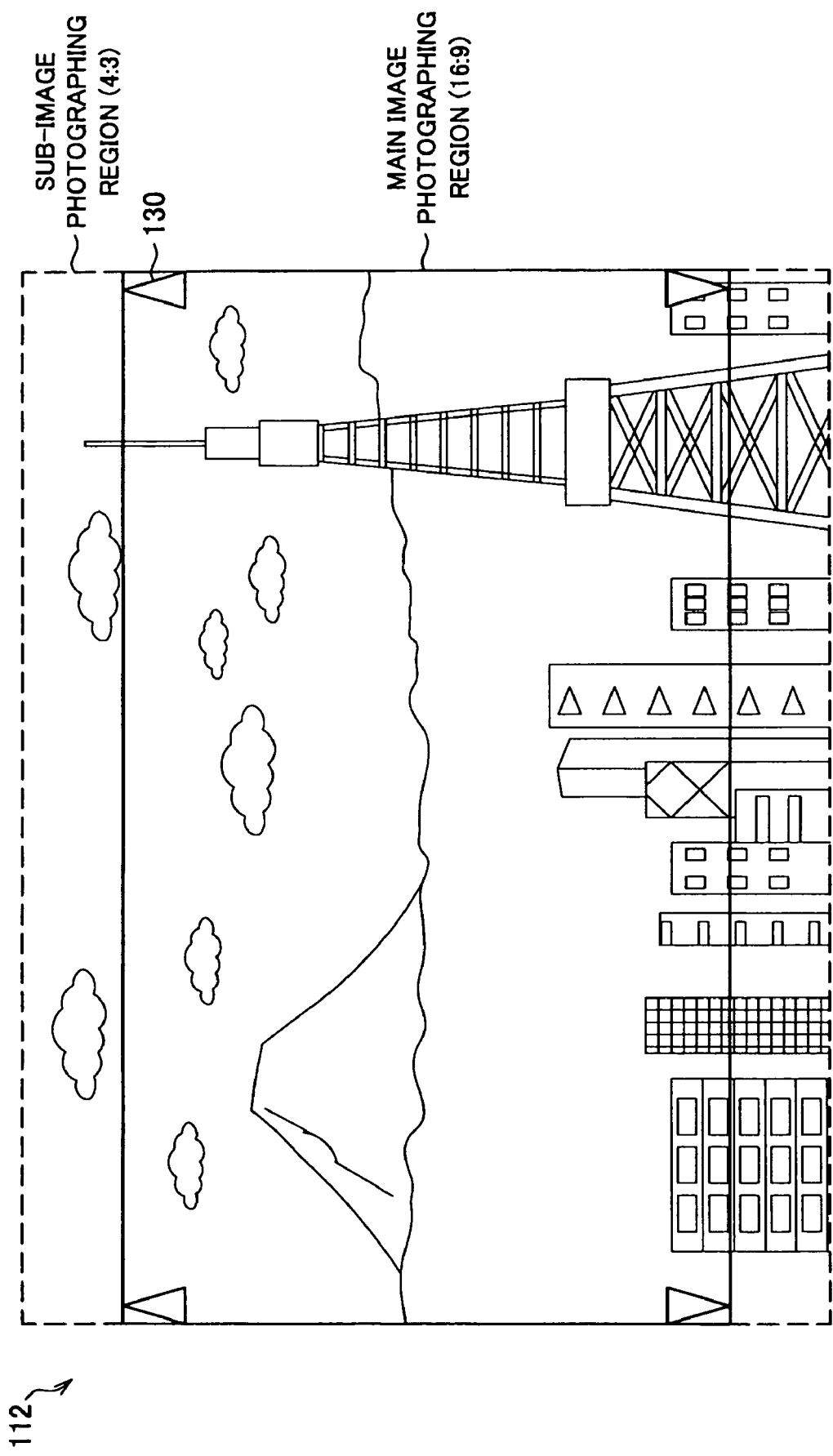
FIG. 4 illustrates a display example corresponding to a frame mode No. 1 on the display unit 112 in the embodiment.

Then, in Step 326, the display control unit 110 displays the image produced by the image combining unit 108 on the display unit 112 in response to the instruction provided from the control unit 122. FIG. 4 illustrates a display example corresponding to the frame mode No. 1 on the display unit 112. As illustrated in FIG. 4, the main image photographing region having the aspect ratio of 16:9 is maximally displayed on the display unit 112 having the display region having the aspect ratio of 16:9. The longitudinal boundary of the sub-image photographing region having the aspect ratio of 4:3 is vertically protruded from the display region of the display unit 112. Accordingly, as illustrated in FIG. 4, the region notification icon 130 notifying the user that the sub-image photographing region exists in the vertical direction is displayed in the display region of the display unit 112, so that the user can recognize where the sub-image photographing region that is not displayed in the display region of the display unit 112 exists while taking the main image based on the image maximally displayed on the display unit 112. The region notification icon 130 desirably has a shape that causes the user to recognize the directionality as illustrated in FIG. 4 in order that the sub-image photographing region is protruded from the display region of the display unit 112.

On the other hand, when determining that the frame mode is not changed to the frame mode No. 1 in Step 304, the control unit 122 determines whether the changed frame mode is the frame mode No. 2 in Step 308.

When determining that the frame mode is changed to the frame mode No. 2 in Step 308, the control unit 122 provides the instruction to perform the processing for displaying the photographing region corresponding to the frame mode No. 2 to the functional units in Step 310. Specifically, in response to the instruction provided from the control unit 122, the image display range extracting unit 104 extracts the image corresponding to the display unit 112 having the aspect ratio of 16:9 from the images fed into the image input unit 102 in the range where the main image image-taking region is maximally displayed. As illustrated in FIG. 2, the longitudinal boundary of the sub-image photographing region corresponding to the frame mode No. 2 exists outside the display region of the display unit 112, and the crosswise boundary of the sub-image photographing region exists in the display region of the display unit 112. Accordingly, the region notification image producing unit 106 produces the region notification image in response to the instruction provided from the control unit 122. That is, the region notification image producing unit 106 produces the region notification icon 130. The region notification icon 130 is used to notify the user that the sub-image photographing region having the aspect ratio of 4:3 is protruded in the vertical direction of the display region of the display unit 112. In response to the instruction provided from the control unit 122, the region notification image producing unit 106 produces the guide frame 132. The guide frame 132 is used to notify the user of the crosswise boundary of the sub-image photographing region in the display region of the display unit 112. The image combining unit 108 produces the image, in which the image extracted by the image display range extracting unit 104 and the region notification image including the region notification icon 130 and guide frame 132 produced by the region notification image producing unit 106 are combined.

Figure 5:
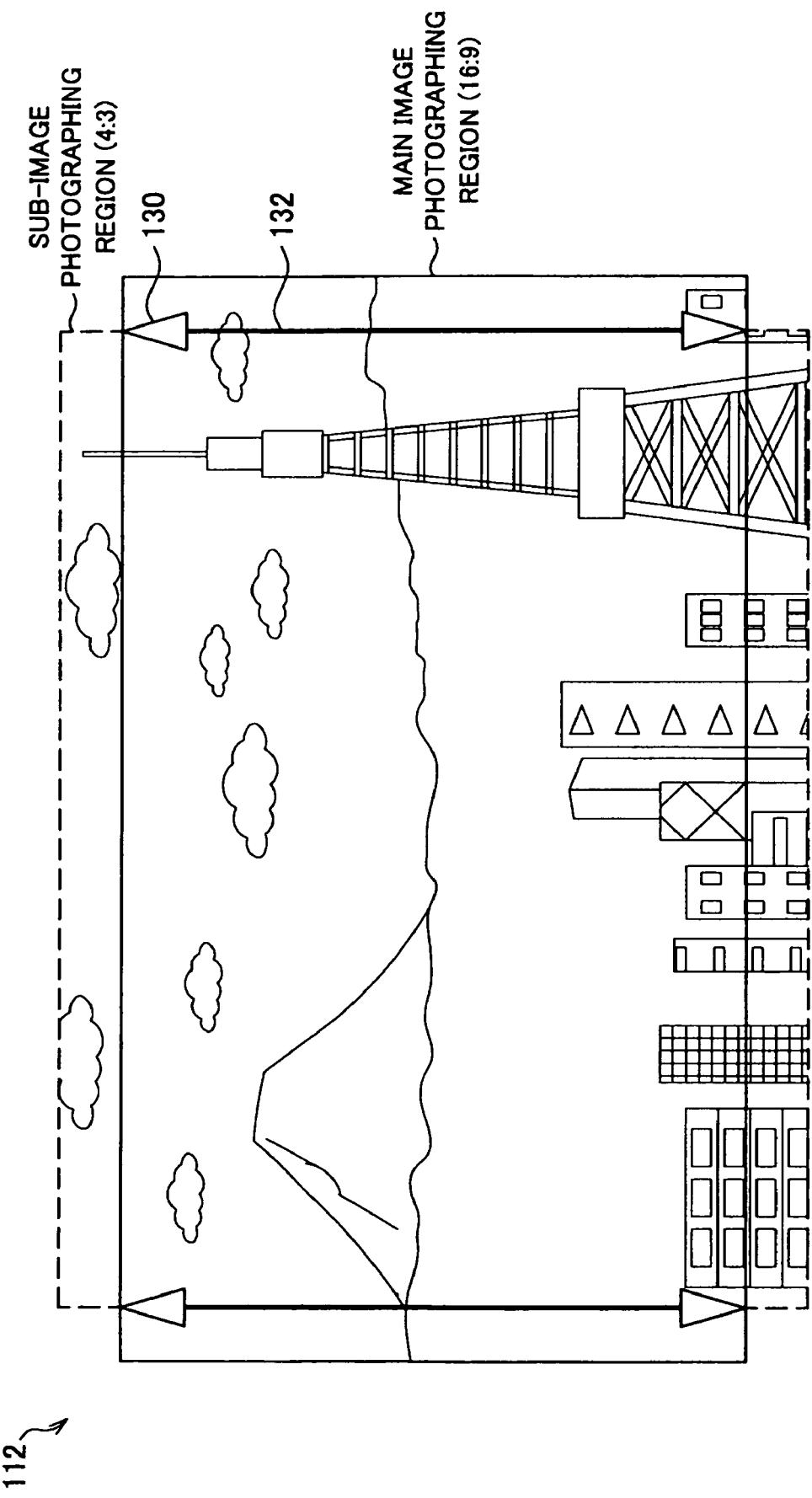
FIG. 5 illustrates a display example corresponding to a frame mode No. 2 on the display unit 112 in the embodiment.

Then, in Step 326, the display control unit 110 displays the image produced by the image combining unit 108 on the display unit 112 in response to the instruction provided from the control unit 122. FIG. 5 illustrates a display example corresponding to the frame mode No. 2 on the display unit 112. As illustrated in FIG. 5, the main image photographing region having the aspect ratio of 16:9 is maximally displayed on the display unit 112 having the display region having the aspect ratio of 16:9. The sub-image photographing region having the aspect ratio of 4:3 is vertically protruded from the display region of the display unit 112. Accordingly, as illustrated in FIG. 5, the region notification icon 130 notifying the user that the sub-image photographing region exists in the vertical direction is displayed in the display region of the display unit 112. The guide frame 132 indicating the crosswise boundary of the sub-image photographing region is displayed in the display region of the display unit 112. Therefore, the user can take the main image based on the image maximally displayed in the display region of the display unit 112. The user can recognize where the boundary of the sub-image photographing region exists in the display region of the display unit 112 and where the sub-image photographing region exists outside the display region.

On the other hand, when determining that the frame mode is not changed to the frame mode No. 2 in Step 308, the control unit 122 determines whether the changed frame mode is the frame mode No. 3 in Step 312.

When determining that the frame mode is changed to the frame mode No. 3 in Step 312, the control unit 122 provides the instruction to perform the processing for displaying the photographing region corresponding to the frame mode No. 3 to the functional units in Step 314. Specifically, in response to the instruction provided from the control unit 122, the image display range extracting unit 104 extracts the image corresponding to the display unit 112 having the aspect ratio of 16:9 from the images fed into the image input unit 102 in the range where the main image image-taking region is maximally displayed. As illustrated in FIG. 2, the crosswise boundary of the sub-image photographing region corresponding to the frame mode No. 3 exists in the display region of the display unit 112. Accordingly, the region notification image producing unit 106 produces the region notification image including the guide frame 132 in response to the instruction provided from the control unit 122. The guide frame 132 is used to notify the user of the crosswise boundary of the sub-image photographing region in the display region of the display unit 112. The image combining unit 108 produces the image, in which the image extracted by the image display range extracting unit 104 and the region notification image including the guide frame 132 produced by the region notification image producing unit 106 are combined.

Figure 6:
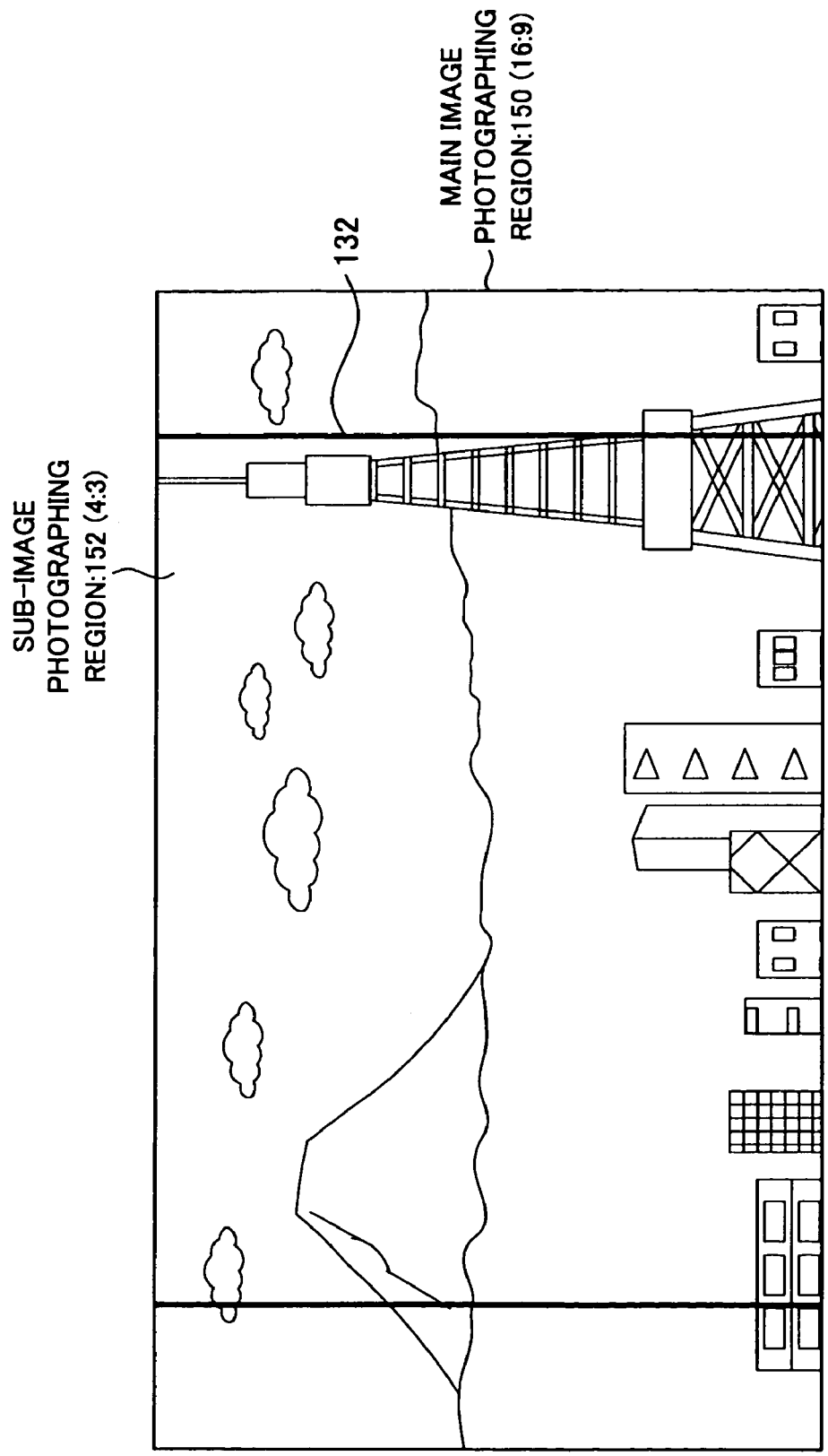
FIG. 6 illustrates a display example corresponding to a frame mode No. 3 on the display unit 112 in the embodiment.

Then, in Step 326, the display control unit 110 displays the image produced by the image combining unit 108 on the display unit 112 in response to the instruction provided from the control unit 122. FIG. 6 illustrates a display example corresponding to the frame mode No. 3 on the display unit 112. As illustrated in FIG. 6, the main image photographing region having the aspect ratio of 16:9 is maximally displayed on the display unit 112 having the display region having the aspect ratio of 16:9. The crosswise boundary of the sub-image photographing region having the aspect ratio of 4:3 exists in the display region of the display unit 112. Accordingly, as illustrated in FIG. 6, the guide frame 132 indicating the crosswise boundary of the sub-image photographing region is displayed in the display region of the display unit 112. Therefore, based on the image maximally displayed in the display region of the display unit 112, the user can recognize the boundary of the sub-image photographing region existing in the display region of the display unit 112 while taking the main image based on the image maximally displayed in the display region of the display unit 112.

In addition to the display unit 112 included in the image-taking apparatus 100, sometimes the external device connected to the image-taking apparatus 100 includes the display unit 112 having the aspect ratio of 4:3. In such cases, the user can select the frame mode Nos. 4 to 6 to display the photographing region on the display device of the external device. Accordingly, when determining that the frame mode is not changed to the frame mode No. 3 in Step 312, the control unit 122 determines whether the changed frame mode is the frame mode No. 4 in Step 316.

When determining that the frame mode is changed to the frame mode No. 4 in Step 316, the control unit 122 provides the instruction to perform the processing for displaying the photographing region corresponding to the frame mode No. 4 to the functional units in Step 318. Specifically, in response to the instruction provided from the control unit 122, the image display range extracting unit 104 extracts the image corresponding to the display unit 112 having the aspect ratio of 4:3 from the images fed into the image input unit 102 in the range where the main image image-taking region is maximally displayed. As illustrated in FIG. 2, the crosswise boundary of the sub-image photographing region corresponding to the frame mode No. 4 exists outside the display region of the display unit 112. Accordingly, in response to the instruction provided from the control unit 122, the region notification image producing unit 106 produces the region notification image including the region notification icon 130. The region notification icon 130 is used to notify the user that the sub-image photographing region having the aspect ratio of 16:9 exists outside the display region of the display unit 112. The image combining unit 108 produces the image, in which the image extracted by the image display range extracting unit 104 and the region notification image including the region notification icon 130 produced by the region notification image producing unit 106 are combined.

Then, in Step 326, the display control unit 110 displays the image produced by the image combining unit 108 on the display unit 112 in response to the instruction provided from the control unit 122.

On the other hand, when determining that the frame mode is not changed to the frame mode No. 4 in Step 316, the control unit 122 determines whether the changed frame mode is the frame mode No. 5 in Step 320.

When determining that the frame mode is changed to the frame mode No. 5 in Step 320, the control unit 122 provides the instruction to perform the processing for displaying the photographing region corresponding to the frame mode No. 5 to the functional units in Step 322. Specifically, in response to the instruction provided from the control unit 122, the image display range extracting unit 104 extracts the image corresponding to the display unit 112 having the aspect ratio of 4:3 from the images fed into the image input unit 102 in the range where the main image image-taking region is maximally displayed. As illustrated in FIG. 2, the crosswise boundary of the sub-image photographing region corresponding to the frame mode No. 5 exists outside the display region of the display unit 112, and the longitudinal boundary of the sub-image photographing region exists in the display region of the display unit 112. Accordingly, the region notification image producing unit 106 produces the region notification image in response to the instruction provided from the control unit 122. That is, the region notification image producing unit 106 produces the region notification icon 130. The region notification icon 130 is used to notify the user that the sub-image photographing region having the aspect ratio of 16:9 is protruded in the horizontal direction of the display region of the display unit 112. In response to the instruction provided from the control unit 122, the region notification image producing unit 106 produces the guide frame 132. The guide frame 132 is used to notify the user of the longitudinal boundary of the sub-image photographing region in the display region of the display unit 112. The image combining unit 108 produces the image, in which the image extracted by the image display range extracting unit 104 and the region notification image including the region notification icon 130 and guide frame 132 produced by the region notification image producing unit 106 are combined.

Then, in Step 326, the display control unit 110 displays the image produced by the image combining unit 108 on the display unit 112 in response to the instruction provided from the control unit 122.

On the other hand, when determining that the frame mode is not changed to the frame mode No. 5 in Step 320, the control unit 122 determines that the frame mode is changed to the frame mode No. 6. Accordingly, the control unit 122 provides the instruction to perform the processing for displaying the photographing region corresponding to the frame mode No. 6 to the functional units. Specifically, in response to the instruction provided from the control unit 122, the image display range extracting unit 104 extracts the image corresponding to the display unit 112 having the aspect ratio of 4:3 from the images fed into the image input unit 102 in the range where the main image image-taking region is maximally displayed. As illustrated in FIG. 2, the sub-image photographing region corresponding to the frame mode No. 6 is matched with the display region of the display unit 112. Accordingly, it is not necessary that the region notification icon 130 and the guide frame 132 be produced for the sub-image photographing region. On the other hand, for the main image photographing region, when the image having the aspect ratio of 16:9 is maximally displayed on the display unit 112 having the aspect ratio of 4:3, the vertical boundary of the main image photographing region exists in the display region of the display unit 112. Accordingly, in response to the instruction provided from the control unit 122, the region notification image producing unit 106 produces the region notification image including the guide frame 132. The guide frame 132 is used to notify the user of the longitudinal boundary of the main image photographing region in the display region of the display unit 112. The image combining unit 108 produces the image, in which the image extracted by the image display range extracting unit 104 and the region notification image including the guide frame 132 produced by the region notification image producing unit 106 are combined.

Then, in Step 326, the display control unit 110 displays the image produced by the image combining unit 108 on the display unit 112 in response to the instruction provided from the control unit 122.

Through the above-described steps, when the user simultaneously takes the images having the plurality of aspect ratios, the sub-image photographing region can be displayed on display unit 112 according to the set frame mode while the main image photographing region is maximally displayed on the display unit 112.

When determining that the user provides the instruction to change the photographing mode in Step 300, the control unit 122 determines whether the frame mode corresponding to the changed photographing mode is registered in Step 328.

When determining that the frame mode corresponding to the changed photographing mode is not registered in Step 328, the control unit 122 provides the instruction to perform the display processing corresponding to the currently set frame mode to the functional units in Steps from Step 306.

On the other hand, when determining that the frame mode corresponding to the changed photographing mode is registered in Step 328, the control unit 122 provides the instruction to perform the processing for displaying the photographing region in the frame mode corresponding to the changed photographing mode to the functional units in Step 330. In response to the instruction provided from the control unit 122, the image display range extracting unit 104, the region notification image producing unit 106, the image combining unit 108, and the display control unit 110 can perform the display processing to the display unit 112 based on the frame mode corresponding to the changed photographing mode. Therefore, in switching the photographing mode, it is not necessary for the user to change the frame mode setting that is of the troublesome manipulation.

In the flowchart of FIG. 3, the frame mode is automatically updated based on the change of the photographing mode. The invention is not limited to the flowchart of FIG. 3. For example, the frame mode may automatically be updated based on the presence or absence of the utilization of the zoom function in simultaneously taking the images having the plurality of different aspect ratios. Therefore, when the sub-image photographing range is scaled by the zoom function while the images having the plurality of different aspect ratios are simultaneously taken, it is not necessary for the user to change the frame mode setting that is of the troublesome manipulation.

In the flowchart of FIG. 3, the image-taking apparatus 100 includes display unit 112 having the display region of the aspect ratio of 16:9, and the external device connected to the image-taking apparatus 100 includes the display unit 112 having the display region of the aspect ratio of 4:3. The invention is not limited to the display units 112 having the display regions of the aspect ratios of 16:9 and 4:3. That is, the aspect ratio of the display region is not limited to the specific value. The display unit 112 may be included only in the image-taking apparatus 100, only in the connected external device, or in both the image-taking apparatus 100 and the external device.

Figure 7:
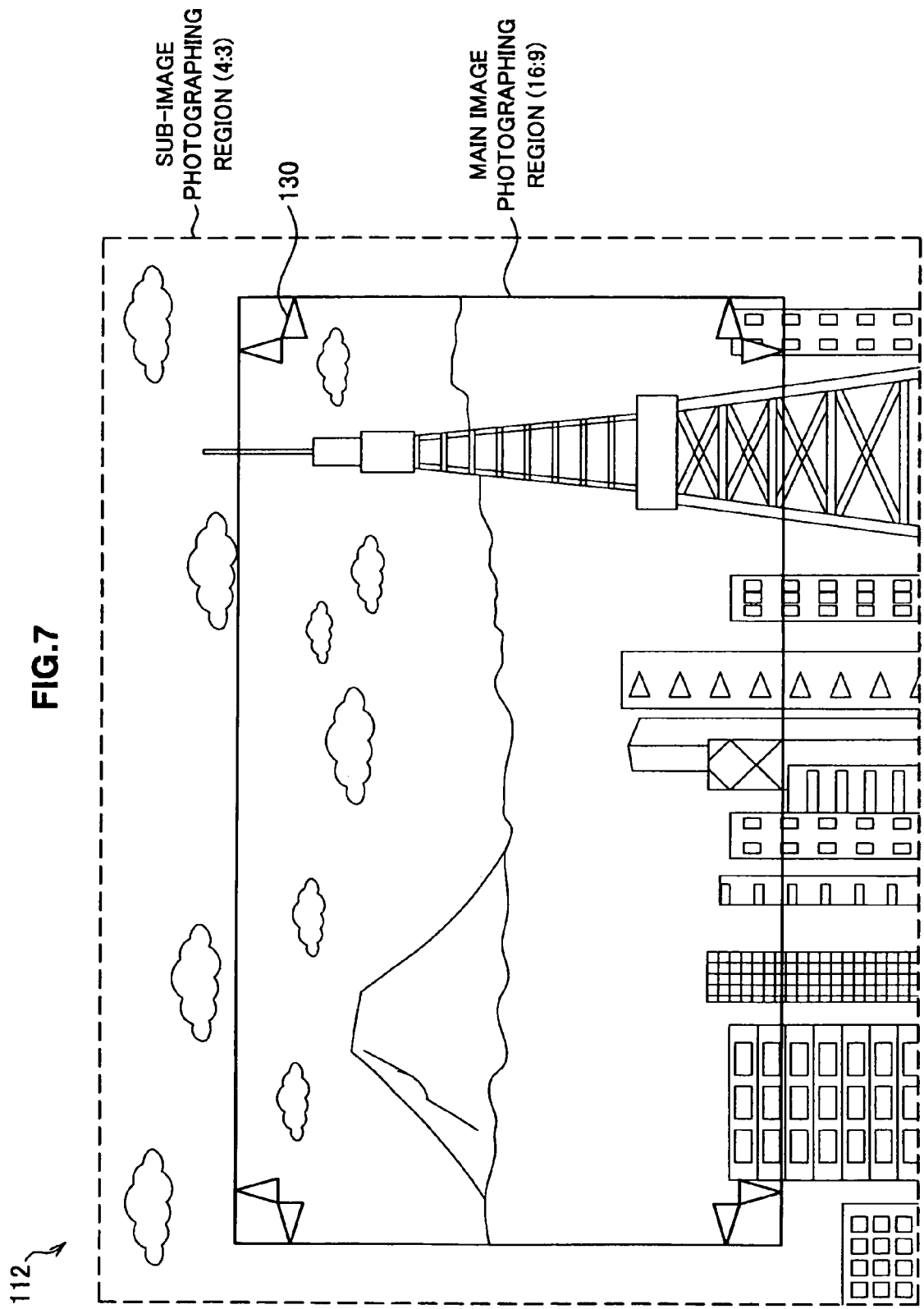
FIG. 7 illustrates a display example of the photographing region on the display unit 112 in the embodiment.

The display examples of FIGS. 4 to 6 corresponding to the frame mode of FIG. 2 are described only by way of example. The invention is not limited to the display examples of FIGS. 4 to 6. That is, when a frame mode except for the frame modes of FIG. 2 is registered, the photographing region corresponding to the frame mode is displayed on the display unit 112. For example, when both the longitudinal boundary and crosswise boundary of the sub-image photographing region exist outside the display region of the display unit 112, the region notification icon 130 of FIG. 7 may be displayed. Thus, in the image-taking apparatus 100 of the embodiment, when the images having the plurality of aspect ratios are simultaneously recorded, the guide frame 132 or the region notification icon 130 can properly be indicated based on the relationship between the sub-image photographing region and the display region of the display unit 112.

(5. FLOW OF PROCESSING FOR DISPLAYING PHOTOGRAPHING REGION IN RECORDING IMAGE DATA)

The flow of the display processing performed to the display unit 112 in actually performing the photographing, that is, in recording the image will be described below. As described above, in the image-taking apparatus 100, when the user selects the mode for simultaneously taking the images having the plurality of aspect ratios, the main image photographing region is maximally displayed on the display unit 112, and the guide frame 132 or region notification icon 130 notifying the user of the sub-image photographing region is displayed on the display unit 112. Further, in the image-taking apparatus 100 of the embodiment, when the user provides the instruction to start the photographing of the moving image file as the sub-image, the region notification icon 130 in display can be changed to cause the user to recognize that the sub-image is currently recorded.

Figure 8:
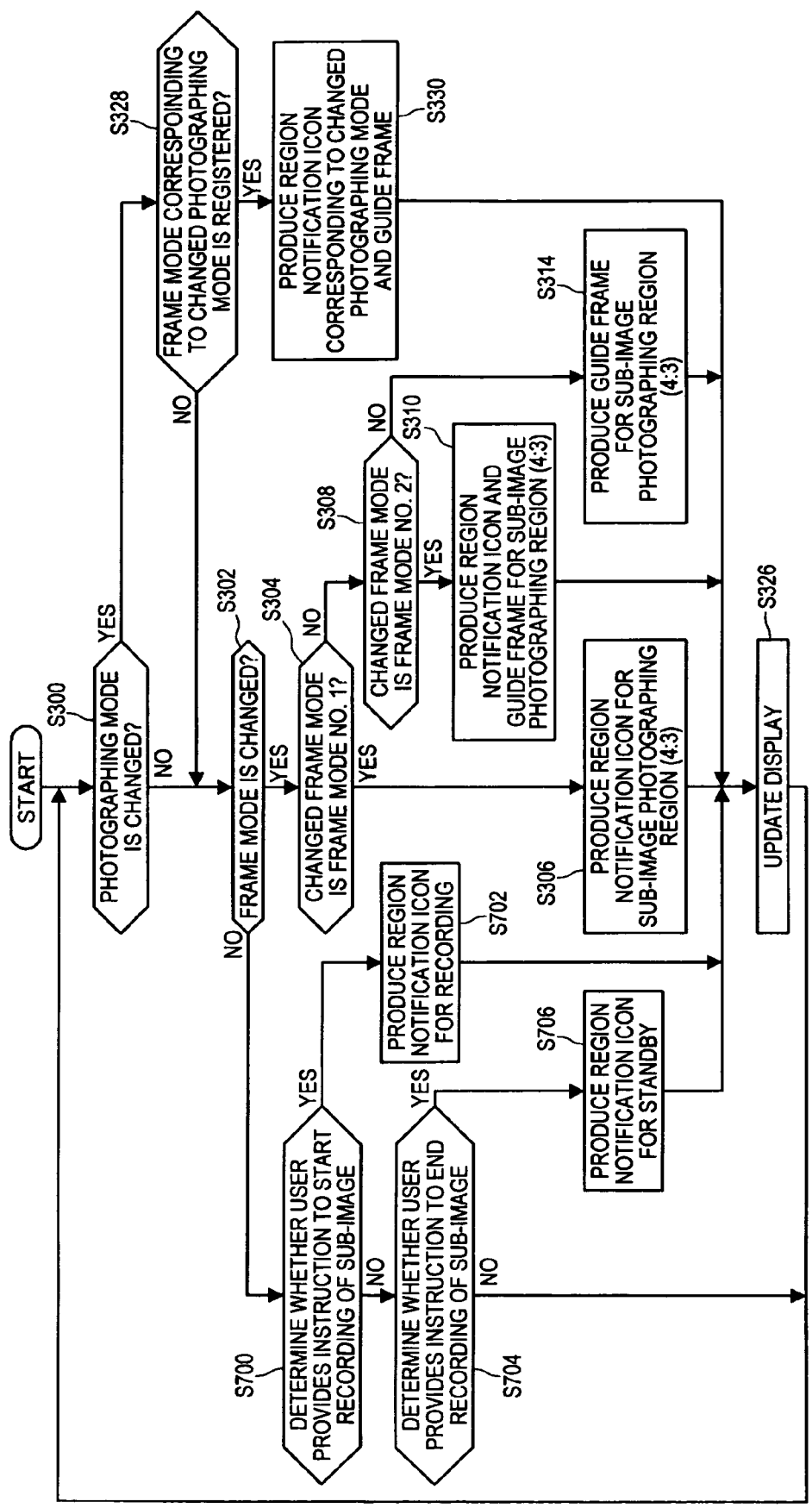
FIG. 8 is a flowchart illustrating an example of processing for display on the display unit 112, performed by the image-taking apparatus 100 of the embodiment, when the user provides an instruction to start video recording of a moving image file as a sub-image.

FIG. 8 is a flowchart illustrating an example of the processing for the display on the display unit 112, performed by the image-taking apparatus 100, when the user provides the instruction to start the video recording of the moving image file as the sub-image when the user selects the mode for simultaneously taking the images having the plurality of aspect ratios. When the user selects the mode for simultaneously taking the images having the plurality of aspect ratios, the flow of the display processing performed to the display unit 112 is similar to the processing flow of FIG. 3. Therefore, the detailed description is omitted. In the processing flow of FIG. 8, the case in which only the frame mode Nos. 1 to 3 are set is described for the sake of convenience. The invention is not limited to the frame mode Nos. 1 to 3, but a frame mode that is different from the frame mode Nos. 1 to 3 may obviously be set.

Referring to FIG. 8, after displaying the predetermined guide frame 132 or region notification icon 130 on the display unit 112, the image-taking apparatus 100 switches the displays of the region notification icon 130 based on whether the user provides the instruction to start the recording of the sub-image. Specifically, in the mode for simultaneously taking the images having the plurality of aspect ratios, when the mode and the frame mode are not changed, the control unit 122 determines whether the user provides the instruction to start the recording of the sub-image in Step 700. The control unit 122 can determine whether the user provides the instruction to start the recording of the sub-image based on the information on the user's manipulation transmitted from the manipulation input unit 120.

When determining that the user provides the instruction to start the recording of the sub-image in Step 700, the control unit 122 provides the instruction to perform the processing for updating a recording region notification icon 134 to the functional units in Step 702. The recording region notification icon 134 is used to be able to notify the user that the sub-image is currently recorded. Specifically, in response to the instruction provided from the control unit 122, the region notification image producing unit 106 produces the region notification image including the recording region notification icon 134 that is different from the region notification icon 130 of the sub-image in the recording standby state. The image combining unit 108 produces the image, in which the image extracted by the image display range extracting unit 104 and the region notification image including the recording region notification icon 134 produced by the region notification image producing unit 106 are combined.

Figure 9:
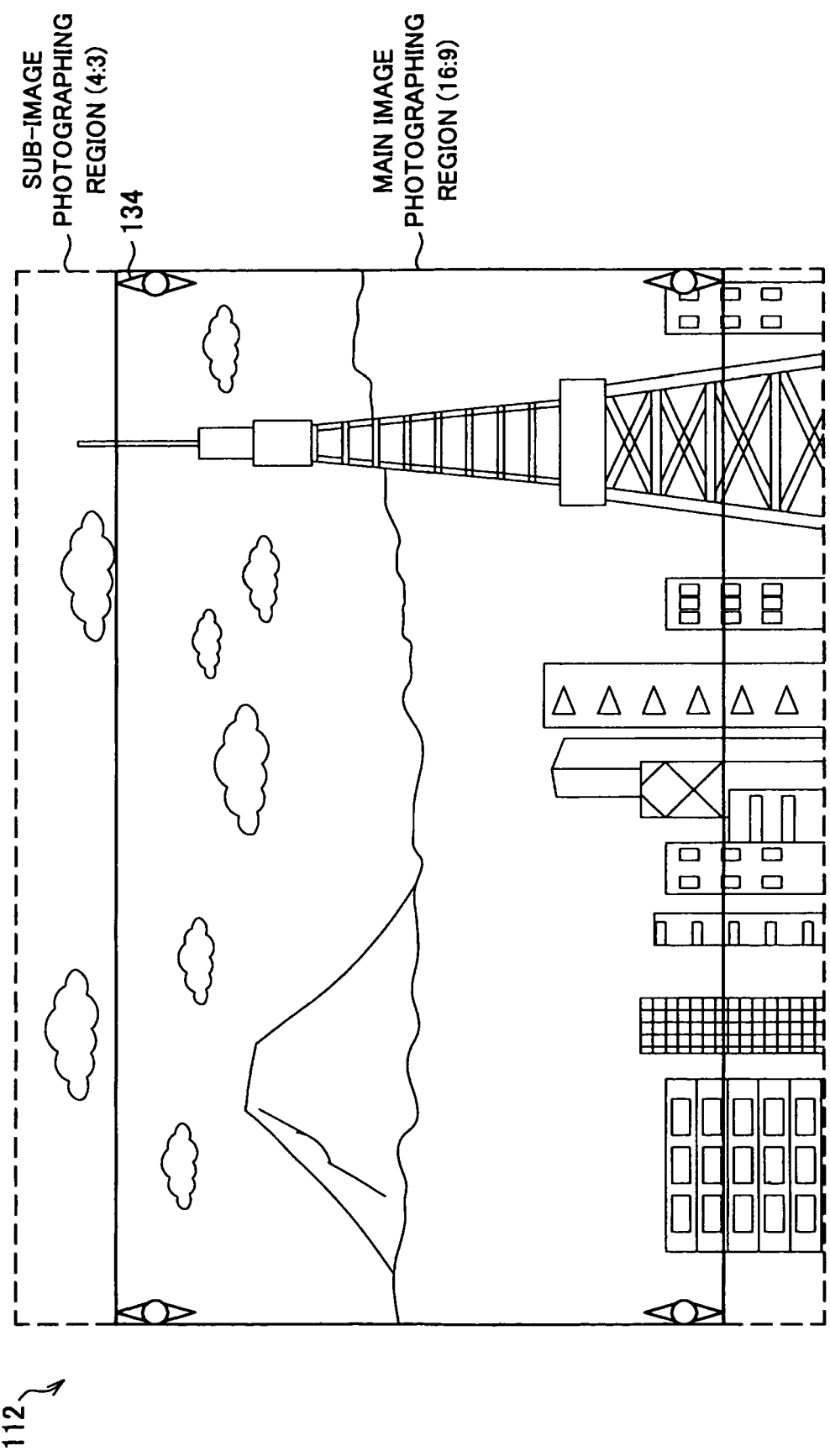
FIG. 9 illustrates a display example of the display unit 112 while a moving image is recorded as the sub-image in the embodiment.

Then, in Step 326, the display control unit 110 displays the image produced by the image combining unit 108 on the display unit 112 in response to the instruction provided from the control unit 122. FIG. 9 illustrates a display example of the display unit 112 while the moving image is recorded as the sub-image. As can be seen from FIG. 9, the recording region notification icon 134 having the shape that is different from the region notification icon 130 of FIG. 4 in the recording standby state is displayed on the display unit 112. As a result, the user can recognize the boundary of the sub-image photographing region and the currently-recorded sub-image while taking the main image based on the image maximally displayed on the display unit 112.

The recording region notification icon 134 of FIG. 9 is used only by way of example, and the invention is not limited to the recording region notification icon 134 of FIG. 9. That is, the recording region notification icon 134 may have the size and shape that are different from those of FIG. 9. For example, the user may be caused to recognize that the sub-image is currently recorded by changing colors of the region notification icon 130 in the recording standby state and the recording region notification icon 134. The user may be caused to notify that the sub-image is currently recorded by blanking the recording region notification icon 134. Thus, in the image-taking apparatus 100 of the embodiment, when the display of the region notification icon 130 in the recording standby state differs from the display of the region notification icon 130 in the recording state, the shape, size, and color of the recording region notification icon 134 are not particularly limited.

On the other hand, when determining that the user does not provide the instruction to start the recording of the sub-image in Step 700, the control unit 122 determines whether the user provides the instruction to end the recording of the sub-image in Step 704. The control unit 122 can determine whether the user provides the instruction to end the recording of the sub-image based on the information on the user's manipulation transmitted from the manipulation input unit 120.

When determining that the user provides the instruction to end the recording of the sub-image in Step 704, the control unit 122 provides the instruction to perform the processing for updating the region notification icon 130 to the functional units in Step 706. The region notification icon 130 is used to be able to notify the user that the sub-image is in the recording standby state. Specifically, in response to the instruction provided from the control unit 122, the region notification image producing unit 106 produces the region notification image including the region notification icon 130 indicating that the sub-image is in the recording standby state. The image combining unit 108 produces the image in which the image extracted by the image display range extracting unit 104 and the region notification image including the region notification icon 130 in the recording standby state, produced by the region notification image producing unit 106, are combined.

Then, in Step 326, the display control unit 110 displays the image produced by the image combining unit 108 on the display unit 112 in response to the instruction provided from the control unit 122. That is, the display control unit 110 switches the display of the display unit 112 in the recording state of FIG. 9 to the display of the display unit 112 in the recording standby state of FIG. 4. As a result, the user can recognize the boundary of the sub-image photographing region in the recording standby state based on the region notification icon 130 or guide frame 132 while taking the main image based on the image maximally displayed on the display unit 112.

Thus, in the image-taking apparatus 100 of the embodiment, in the mode for simultaneously recording the images having the plurality of aspect ratios, the display of the region notification icon 130 can appropriately be updated between the case in which the sub-image is in the recording standby state and the case in which the sub-image is currently recorded. As a result, the user can recognize the boundary of the sub-image photographing region and whether the sub-image is currently recorded while taking the main image based on the image maximally displayed on the display unit 112. That is, in the image-taking apparatus 100 of the embodiment, the usability can be enhanced in simultaneously taking the images having the plurality of aspect ratios.

(6. EXAMPLE OF UTILITY IN WHICH PHOTOGRAPHS ARE SIMULTANEOUSLY TAKEN WITH IMAGE-TAKING APPARATUS 100)

An example of utility in which the images having the plurality of aspect ratios are simultaneously taken with the image-taking apparatus 100 of the embodiment will be described below. As described above, in the image-taking apparatus 100, in simultaneously taking the images having the plurality of aspect ratios, the main image photographing region is maximally displayed on the display unit 112, and the user can be caused to recognize the boundary of the sub-image photographing region using the guide frame 132 or the region notification icon 130. The user can apply the image-taking apparatus 100 of the embodiment to fixed-point observation or experimental photographing by utilizing the features.

Figure 10:
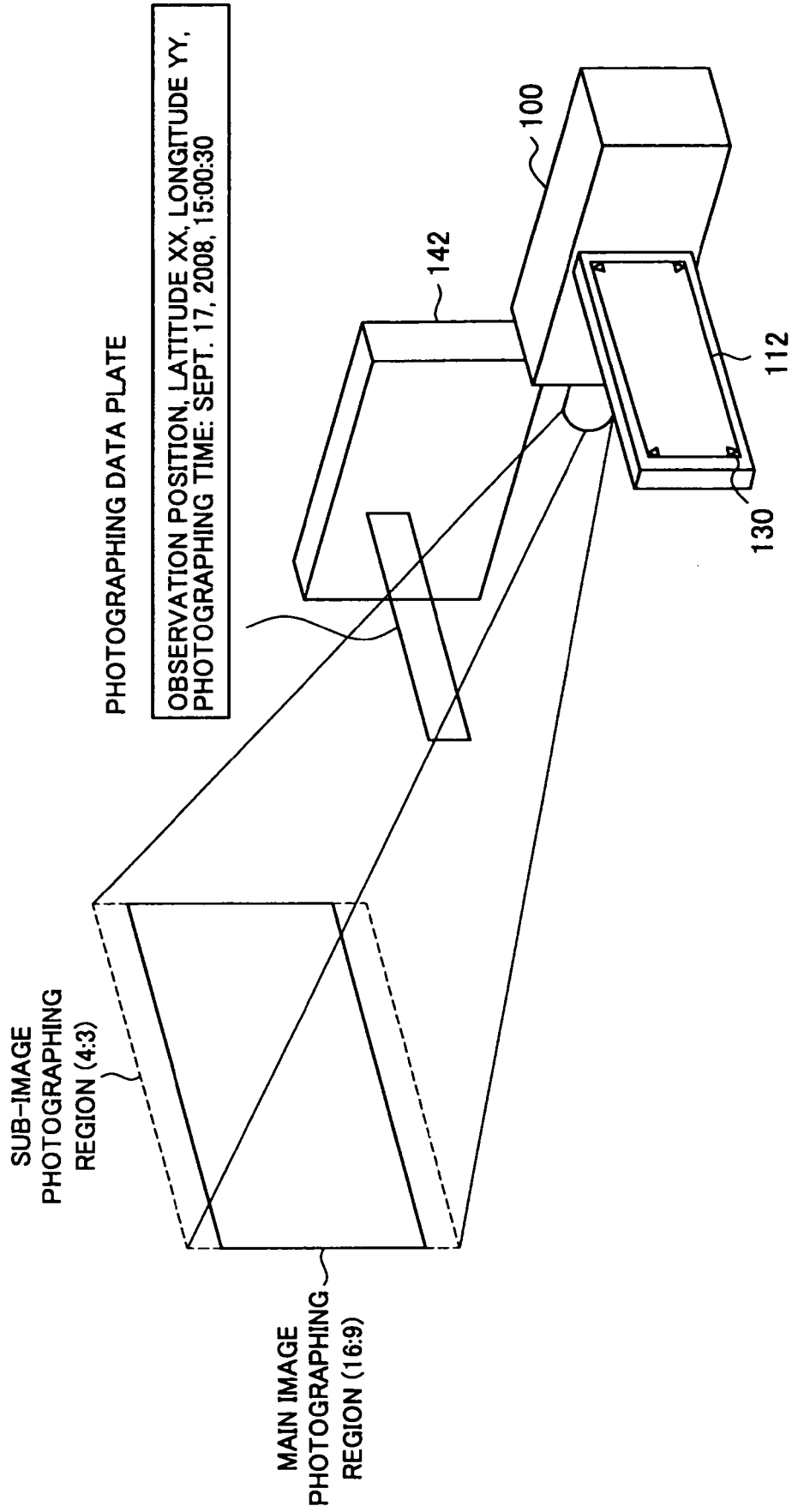
FIG. 10 illustrates a concept when the image-taking apparatus 100 of the embodiment is used in fixed-point observation or experimental photographing.

FIG. 10 illustrates a concept when the image-taking apparatus 100 of the embodiment is used in the fixed-point observation or the experimental photographing. In the example of FIG. 10, the image-taking apparatus 100 is used when the user takes the sub-image of the moving image (or still image) having the aspect ratio of 4:3 as reference data while taking the moving image having the aspect ratio of 16:9 as the main image. Because the user takes the moving image having the aspect ratio of 16:9 as the main image, the main image photographing region having the aspect ratio of 16:9 is maximally displayed on the display region of the display unit 112 as described above. As a result, the user can perform the adjustment and manipulation, such as the flaming and focusing of the desired image, which are necessary for the photographing while seeing the main image photographing region maximally displayed in the display region of the display unit 112.

Because the boundary of the sub-image photographing region having the aspect ratio of 4:3 is vertically protruded from the image display region of the display unit 112, the region notification icon 130 is displayed on the display unit 112. Accordingly, the user can visually recognize that the sub-image photographing region having the aspect ratio of 4:3 exists outside the image displayed in the display region of the display unit 112.

In performing the fixed-point observation or the experimental photographing, frequently it is necessary that an observation position and a photographing time be simultaneously recorded in the image file. In such cases, as illustrated in FIG. 10, the user fixes a photographing data plate in which the observation position and the photographing time are written using a jig, which allows the user to record the information written in the photographing data plate only in the sub-image having the aspect ratio of 4:3 while the information is overlapped with the sub-image. The user temporarily switches the display on the display unit 112 such that the sub-image photographing region is displayed, thereby confirming that the photographing data plate is included in the sub-image photographing region having the aspect ratio of 4:3. Then, as described above, the photographing can be performed while the main image photographing region is maximally displayed on the display unit 112. Even in performing the photographing, because the region notification icon 130 is indicated in the display unit 112, the user can recognize that the sub-image photographing region having the aspect ratio of 4:3 exists outside the display region of the display unit 112, and the user can recognize that the photographing data plate is simultaneously recorded.

Figure 11:
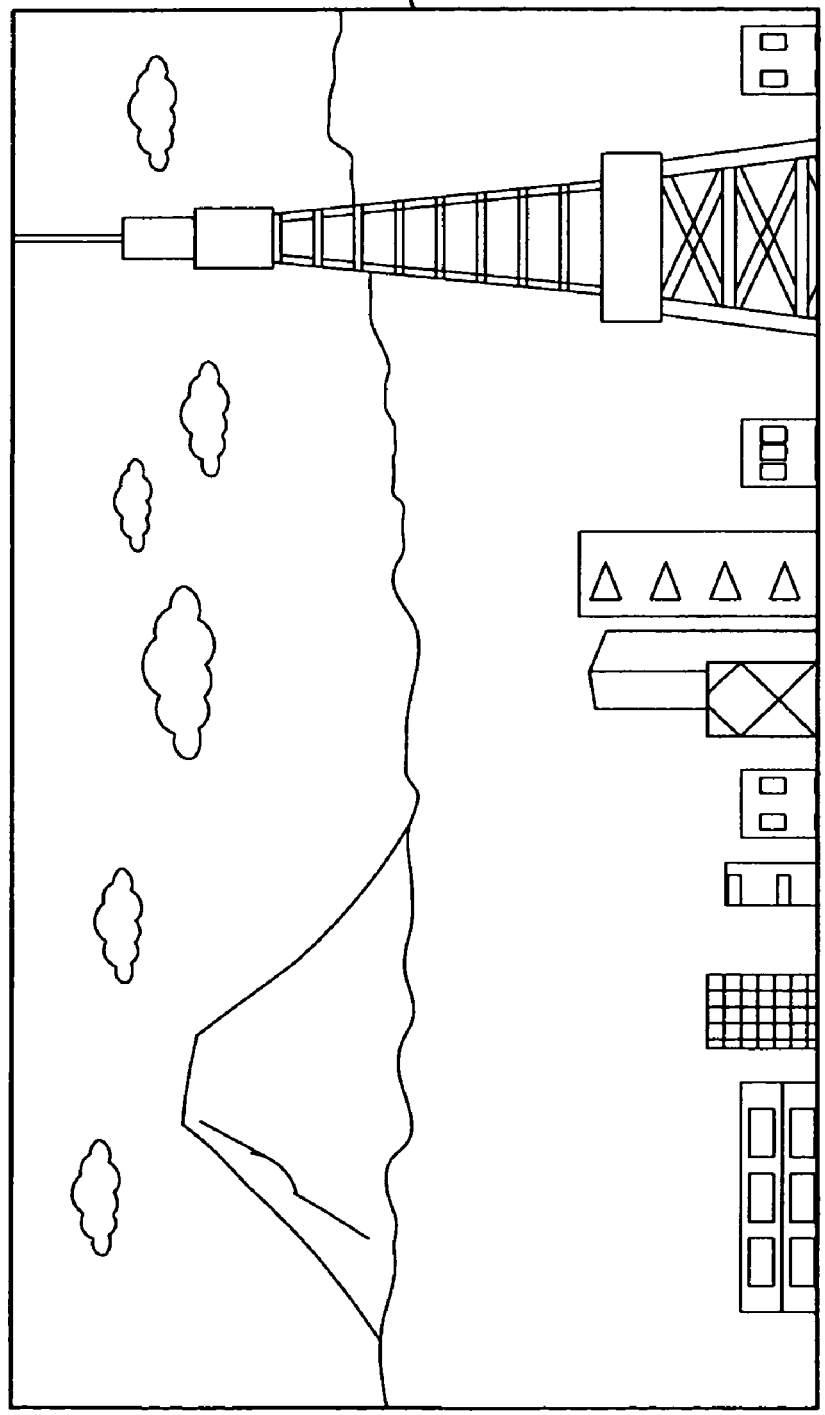
FIG. 11 illustrates an example of a main image having an aspect ratio of 16:9, which is recorded with the image-taking apparatus 100 of the embodiment.
Figure 12:
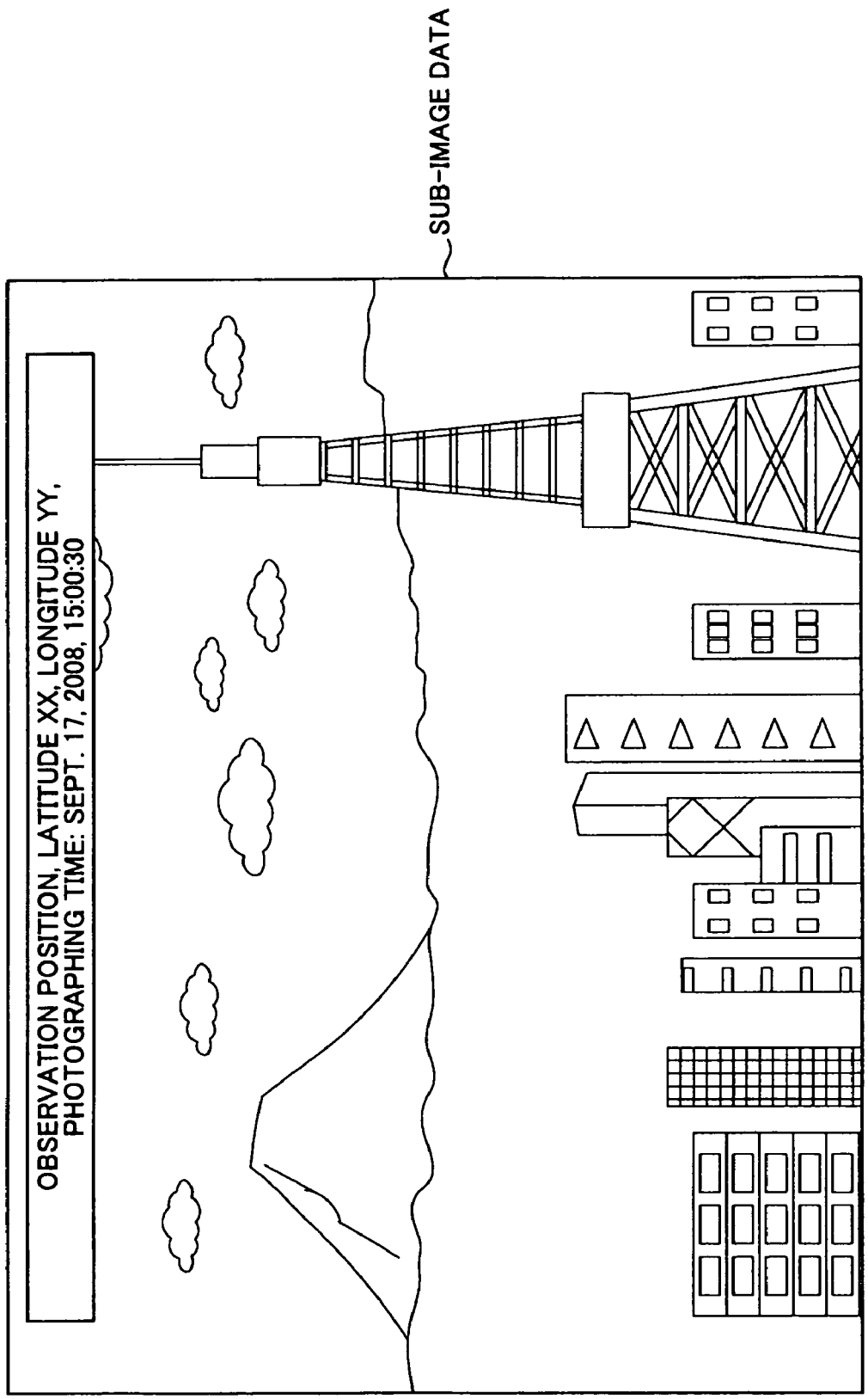
FIG. 12 illustrates an example of a main image having an aspect ratio of 4:3, which is recorded with the image-taking apparatus 100 of the embodiment.

FIGS. 11 and 12 illustrate the moving image data and moving image (or still image) data, which are simultaneously recorded, respectively. The moving image data having the aspect ratio of 16:9 is of the main image, and the moving image data having the aspect ratio of 4:3 is of the sub-image. The moving image data having the aspect ratio of 16:9 that is of the main image of FIG. 11 is recorded while the moving image (or still image) data having the aspect ratio of 4:3 that is of the sub-image of FIG. 12 is recorded. As can be seen from FIG. 12, the photographing data plate that is not displayed in the display region of the display unit 112 is displayed in the upper portion of the sub-image.

As with the above-described utility, it is not always necessary that the user confirm the photographing region of the secondarily-recorded sub-image in simultaneously taking the images having the plurality of aspect ratios. On the contrary, the user always confirms the photographing region of the mainly-taken main image to want to properly adjust and manipulate the flaming and the focusing. The image-taking apparatus 100 of the embodiment can utilize the features to respond to the demand of the user, and image-taking apparatus 100 can provide the high-usability photographing function.

The utility of the image-taking apparatus 100 of FIG. 10 is described only by way of example. The image-taking apparatus 100 of the embodiment can obviously be used in various photographing modes. In the example of FIG. 10, the photographing data plate is fixed to the jig. The image-taking apparatus 100 manages predetermined plate information on the observation position, the photographing time, and a photographer, and the image-taking apparatus 100 may automatically record the plate information while the plate information is overlapped with the sub-image. In the image-taking apparatus 100, the plate information recorded in the sub-image is stored in the storage unit such as ROM, and the plate information can be recorded in the sub-image photographing region existing outside the display region of the display unit 112 in recording the sub-image while overlapped with the sub-image photographing region. Therefore, for example, the user sets any character or symbol as the plate information through the manipulation input unit 120, which allows the desired plate information to be recorded in the sub-image in the overlapping manner.

(7. HARDWARE CONFIGURATION OF IMAGE-TAKING APPARATUS 100)

Figure 13:
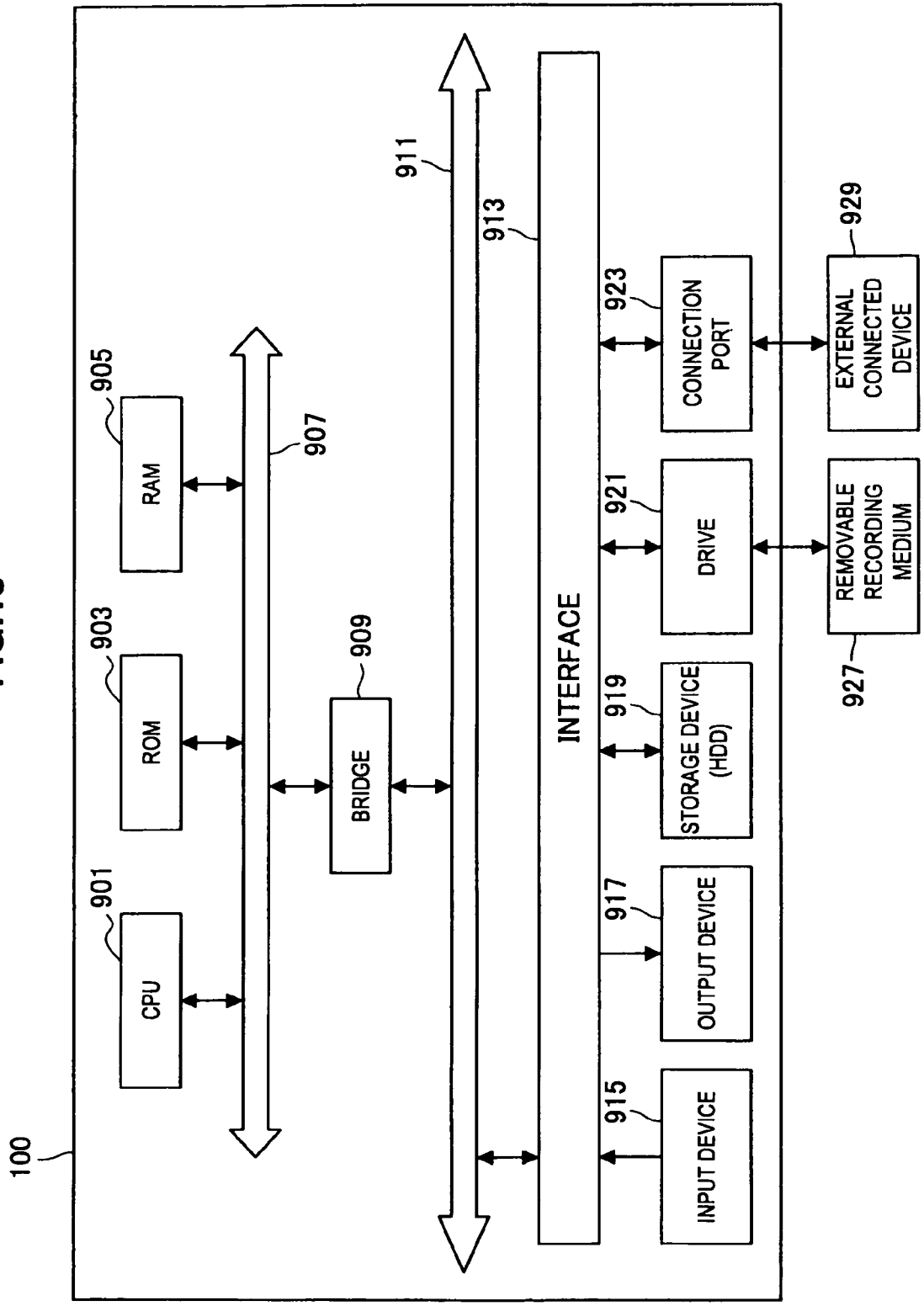
FIG. 13 is a block diagram illustrating an example of a hardware configuration of the image-taking apparatus 100 of the embodiment.

A hardware configuration of the image-taking apparatus 100 of the embodiment will be described in detail with reference to FIG. 13. FIG. 13 is a block diagram illustrating an example of the hardware configuration of the image-taking apparatus 100 of the embodiment.

The image-taking apparatus 100 includes CPU 901, ROM 903, RAM 905, a bridge 909, an interface 913, an input device 915, an output device 917, a storage device 919, a drive 921, and a connection port 923.

CPU 901 acts as an operation processing device or a control device, and CPU 901 controls the whole or part of the operations in the image-taking apparatus 100 according to various programs recorded in ROM 903, RAM 905, the storage device 919, or a removable recording medium 927. The programs and operation parameters used in the CPU 901 are stored in ROM 903. The programs executed in CPU 901 and parameters appropriately changed in the execution are primarily stored in RAM 905. CPU 901, ROM 903, RAM 905, the storage device 919, and the removable recording medium 927 are connected to one another by a host bus 907 including an internal bus such as a CPU bus.

The host bus 907 is connected to an external bus 911 such as a PCI (Peripheral Component Interconnect/Interface) bus through the bridge 909.

The input device 915 is manipulation means, such as a touch panel, a button, a switch, and a lever, which is used by the user. The input device 915 may be remote-control means (so-called remote-controller) in which an infrared ray or other radio waves are used. The user can manipulate the input device 915 to provide various processing operations to the image-taking apparatus 100 through the manipulation input unit 120 or control unit 122.

For example, the output device 917 includes a device that can visually or aurally notify the user of various kinds of information. Examples of the device that can visually or aurally notify the user of various kinds of information include a display device such as a liquid crystal display device, a plasma display device, and an EL display device and a sound output device such as a speaker and a headphone. The photographing image or the menu screen can be displayed on the output device 917 according to the processing of the display unit 112.

The storage device 919 is a device in which the data is stored, and the storage device 919 is an example of the storage unit of the image-taking apparatus 100. Examples of the storage device 919 include a magnetic storage device such as HDD, a semiconductor storage device, an optical storage device, and a magneto-optical storage device. The programs executed in CPU 901, various kinds of data, and photographed image data are stored in the storage device 919.

The drive 921 is a reader/writer for recording medium, and the drive 921 is incorporated in the image-taking apparatus 100 or the drive 921 is externally attached to the image-taking apparatus 100. The drive 921 reads the information recorded in the loaded magnetic disk, optical disk, and magneto-optical disk or the removable recording medium 927 such as a semiconductor memory, and the drive 921 supplies the information to RAM 905. The drive 921 can write the image data in the loaded removable recording medium 927.

The connection port 923 is one, such as a USB port, an optical audio terminal, and an HDMI (High-Definition Multimedia Interface) port, which is used to directly connect the image-taking apparatus 100 to an external connected device 929. When the external connected device 929 is connected to the connection port 923, the image-taking apparatus 100 can obtain the image data from the external connected device 929, or the image-taking apparatus 100 can transfer the image data recorded in the external connected device 929. When the image-taking apparatus 100 is connected to the external connected device 929 through the HDMI port, the image-taking apparatus 100 can obtain the detailed specifications including the aspect ratio about the display device included in the external connected device 929.

The implementable hardware configuration is described by way of example as the function of the image-taking apparatus 100 of the embodiment. Each component may include a general-purpose member, or each component may include hardware dedicated to the function of each component.

Accordingly, the hardware configuration can appropriately be changed according to the technical level in the time the image-taking apparatus 100 of the embodiment is implemented.

(8. SUMMARY)

In the image-taking apparatus 100, the photographing region (main image photographing region) of the main image that the user mainly wants to take can be maximally displayed in the display region of the display unit 112 when the images having the plurality of aspect ratios are simultaneously taken. Therefore, the user can adjust and manipulate the flaming and focusing of the main image while seeing the main image photographing region maximally displayed on the display unit 112. The image-taking apparatus 100 can display the guide frame 132 or the region notification icon 130 when the photographing region (sub-image photographing region) of the sub-image that the user secondarily wants to take exists outside the display region of the display unit 112. Therefore, the user can visually recognize that the sub-image photographing region exists outside the display region of the display unit 112. Accordingly, the user can perform the simultaneous photographing while the main image photographing region is maximally displayed in the display region of the display unit 112 after the sub-image photographing region is determined once, so that the usability can be enhanced in simultaneously taking the images having the plurality of aspect ratios in the image-taking apparatus 100 of the embodiment.

In the image-taking apparatus 100, the display of the region notification icon 130 is appropriately updated between the sub-image recording function in the standby state and the sub-image recording function in the performing state, which allows the user to visually recognize where the sub-image recording function is performed. The image-taking apparatus 100 can record the plate information in which the predetermined character or symbol is recorded in the sub-image photographing region existing outside the display region of the display unit 112 while overlapping the plate information with the sub-image photographing region. Thus, in the image-taking apparatus 100 of the embodiment, the usability can further be enhanced by additionally providing the function of updating the displayed region notification icon 130 and the function of recording the plate information in the sub-image when the image having the plurality of aspect ratios are simultaneously taken.

It should be understood by those skilled in the art that various modifications, combinations, sub-combinations and alterations may occur depending on design requirements and other factors insofar as they are within the scope of the appended claims or the equivalents thereof.

For example, the display example of the display unit 112 of appended drawings shown in the embodiment is described only by way of example, and the invention is not limited to the display example of the display unit 112. For example, the shape and size of the region notification icon 130 are not limited to the examples illustrated in the drawings, but any shape and size may be adopted as long as the shape and size of the region notification icon indicate that the sub-image photographing region exists outside the display region of the display unit 112.

In the embodiment, the types and combinations of the frame mode are described only by way of example, and the invention is not limited to the types and combinations of the frame mode in the embodiment. For example, the image-taking apparatus 100 can take an image having an aspect ratio except for the above described aspect ratios, and the image-taking apparatus 100 can obviously include the display unit 112 having the display device of the aspect ratio except for the above described aspect ratios. The number of frame modes managed by the image-taking apparatus 100 is not limited to that of the embodiment, but the image-taking apparatus 100 can arbitrarily manage the number of frame modes according to the type of the photographing mode, the number of photographing modes, and performance.

In the specification, the step described in the flowchart includes not only the pieces of processing performed in time series along the described order but also the pieces of processing performed in parallel or in separate manner. Even in the step performed in time series, possibly the order can appropriately be changed.

What is claimed is:

1. An image-taking apparatus comprising:
   an image recording range extracting unit that extracts an image corresponding to a first image-taking region having a predetermined first aspect ratio and an image corresponding to a second image-taking region having a predetermined second aspect ratio from a video image of a subject of an image-taking target to record the image corresponding to the first image-taking region and the image corresponding to the second image-taking region, the second aspect ratio being different from the first aspect ratio;
   an image display range extracting unit that extracts an image having an aspect ratio of a display region of a display device from the video image of the subject of the image-taking target in a range where the first image-taking region is maximally displayed, the display device displaying the images corresponding to the first image-taking region and the second image-taking region;
   a region notification image producing unit that produces a region notification image indicating that the second image-taking region exists outside the display region of the display device when the second image-taking region exists outside the region of the image extracted by the image display range extracting unit;
   an image combining unit that produces a display image by combining the region notification image produced by the region notification image producing unit with the image extracted by the image display range extracting unit; and
   a display control unit that displays the display image produced by the image combining unit on the display device,
   wherein the region notification image producing unit produces the region notification image including a region notification icon, indicating a direction of the second image-taking region existing outside the display region of the display device,
   wherein the region notification image producing unit produces the region notification image including a guide frame indicating a boundary of the second image-taking region when part of the boundary of the second image-taking region exists in the display region of the display device, the guide frame,
   wherein a combination of the first aspect ratio and the second aspect ratio is an aspect ratio that is arbitrarily selected by a user,
   wherein a combination of the first aspect ratio and the second aspect ratio is automatically switched according to an image-taking mode selected by the user, and
   wherein the region notification image producing unit produces a region notification image that is different from a region notification image in a state in which the image recording range extracting unit does not record the image corresponding to the second image-taking region, when the image recording range extracting unit is recording the image corresponding to the second image-taking region.

2. The image-taking apparatus according to claim 1, wherein the image recording range extracting unit records the image corresponding to the second image-taking region by combining predetermined memo information with the second image-taking region existing outside the display region of the display device.

* * * * *